United States Patent
Wang et al.

(10) Patent No.: US 12,193,013 B2
(45) Date of Patent: Jan. 7, 2025

(54) SOFT CANCELLATION OF SIDELINK TRANSMISSIONS

(71) Applicant: QUALCOMM Incorporated, San Diego, CA (US)

(72) Inventors: Xiaojie Wang, Hillsborough, NJ (US); Piyush Gupta, Bridgewater, NJ (US); Xiaoxia Zhang, San Diego, CA (US); Jing Sun, San Diego, CA (US); Junyi Li, Fairless Hills, PA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 595 days.

(21) Appl. No.: 17/448,040

(22) Filed: Sep. 17, 2021

(65) Prior Publication Data

US 2023/0090167 A1    Mar. 23, 2023

(51) Int. Cl.
*H04W 52/00* (2009.01)
*H04W 24/08* (2009.01)
*H04W 52/24* (2009.01)
*H04W 52/34* (2009.01)
*H04W 52/36* (2009.01)
*H04W 72/23* (2023.01)

(52) U.S. Cl.
CPC .......... *H04W 72/23* (2023.01); *H04W 24/08* (2013.01); *H04W 52/243* (2013.01); *H04W 52/34* (2013.01); *H04W 52/367* (2013.01)

(58) Field of Classification Search
None
See application file for complete search history.

(56) References Cited

U.S. PATENT DOCUMENTS

2022/0210747 A1*   6/2022   Lee ................. H04W 92/18
2022/0346118 A1*   10/2022   Wu ................. H04L 1/1825

* cited by examiner

*Primary Examiner* — Abdelillah Elmejjarmi
(74) *Attorney, Agent, or Firm* — Procopio, Cory, Hargreaves & Savitch LLP

(57) ABSTRACT

Methods, apparatuses, and computer-readable medium for soft cancellation of sidelink transmissions are provided. An example method may include receiving, from a base station, DCI comprising at least one of: an open loop power control parameter, a maximum transmit power, or a closed loop power control parameter. The open loop power control parameter, the maximum transmit power, or the closed loop power control parameter may be associated with a PSSCH or a PSCCH. The example method may further include reducing a transmit power of a scheduled transmission associated with the PSSCH or the PSCCH to a reduced transmit power if the reduced transmit power is above a threshold or cancel the scheduled transmission if the reduced transmit power is below the threshold. The reduced transmit power may be based on the open loop power control parameter, the maximum transmit power, or the closed loop power control parameter.

28 Claims, 18 Drawing Sheets

SOFT CANCELLATION OF SIDELINK TRANSMISSIONS

TECHNICAL FIELD

The present disclosure relates generally to communication systems, and more particularly, to wireless communication systems with sidelink (SL) transmissions.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. The apparatus may include a memory and at least one processor coupled to the memory. The memory and the at least one processor coupled to the memory may be configured to receive, from a base station, downlink control information (DCI) including at least one of: an open loop power control parameter, a maximum transmit power, or a closed loop power control parameter. The open loop power control parameter, the maximum transmit power, or the closed loop power control parameter may be associated with a physical sidelink shared channel (PSSCH) or a physical sidelink control channel (PSCCH). The memory and the at least one processor coupled to the memory may be further configured to reduce a transmit power of a scheduled transmission associated with the PSSCH or the PSCCH to a reduced transmit power if the reduced transmit power is above a threshold or cancel the scheduled transmission if the reduced transmit power is below the threshold. The reduced transmit power may be based on the open loop power control parameter, the maximum transmit power, or the closed loop power control parameter.

In another aspect of the disclosure, a method, a computer-readable medium, and an apparatus at a UE are provided. The apparatus may include a memory and at least one processor coupled to the memory. The memory and the at least one processor coupled to the memory may be configured to receive, from a base station, DCI including at least one of: an open loop power control parameter, a maximum transmit power, or a closed loop power control parameter. The open loop power control parameter, the maximum transmit power, or the closed loop power control parameter may be associated with a PSSCH or a PSCCH. The memory and the at least one processor coupled to the memory may be further configured to receive, from a second UE, a scheduled transmission with a transmit power, based on the open loop power control parameter, the maximum transmit power, or the closed loop power control parameter, the transmit power of the scheduled transmission associated with the PSSCH or the PSCCH if the transmit power is above a threshold.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
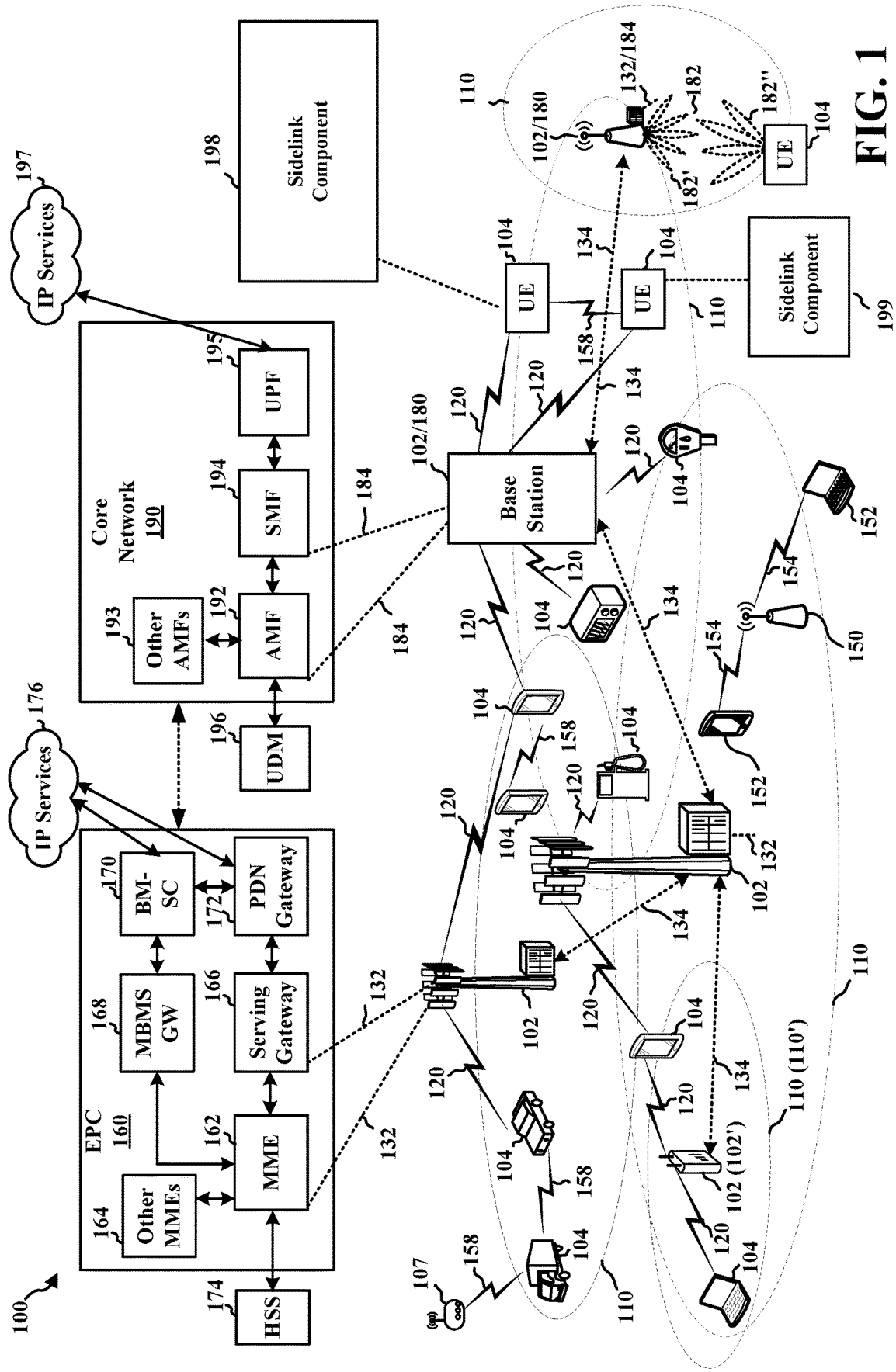
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

Referring again to FIG. 1, in some aspects, a UE 104, or other device communicating based on sidelink, may include a sidelink component 198. The sidelink component 198 may be configured to receive, from a base station, DCI including at least one of: an open loop power control parameter, a maximum transmit power, or a closed loop power control parameter. The open loop power control parameter, the maximum transmit power, or the closed loop power control parameter may be associated with a PSSCH or a PSCCH. The sidelink component 198 may be further configured to reduce a transmit power of a scheduled transmission associated with the PSSCH or the PSCCH to a reduced transmit power if the reduced transmit power is above a threshold or cancel the scheduled transmission if the reduced transmit power is below the threshold. The reduced transmit power may be based on the open loop power control parameter, the maximum transmit power, or the closed loop power control parameter.

In some aspects, a UE 104, or other device communicating based on sidelink, may include a sidelink component 199. The sidelink component 198 may be configured to receive, from a base station, DCI including at least one of: an open loop power control parameter, a maximum transmit power, or a closed loop power control parameter. The open loop power control parameter, the maximum transmit power, or the closed loop power control parameter may be associated with a PSSCH or a PSCCH. The sidelink component 198 may be further configured to receive, from a second UE, a scheduled transmission with a transmit power, based on the open loop power control parameter, the maximum transmit power, or the closed loop power control parameter, the transmit power of the scheduled transmission associated with the PSSCH or the PSCCH if the transmit power is above a threshold.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for sidelink communication, e.g., between UEs.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, the aspects may be similarly applied between a first and second device (e.g., a first and second UE) for sidelink communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
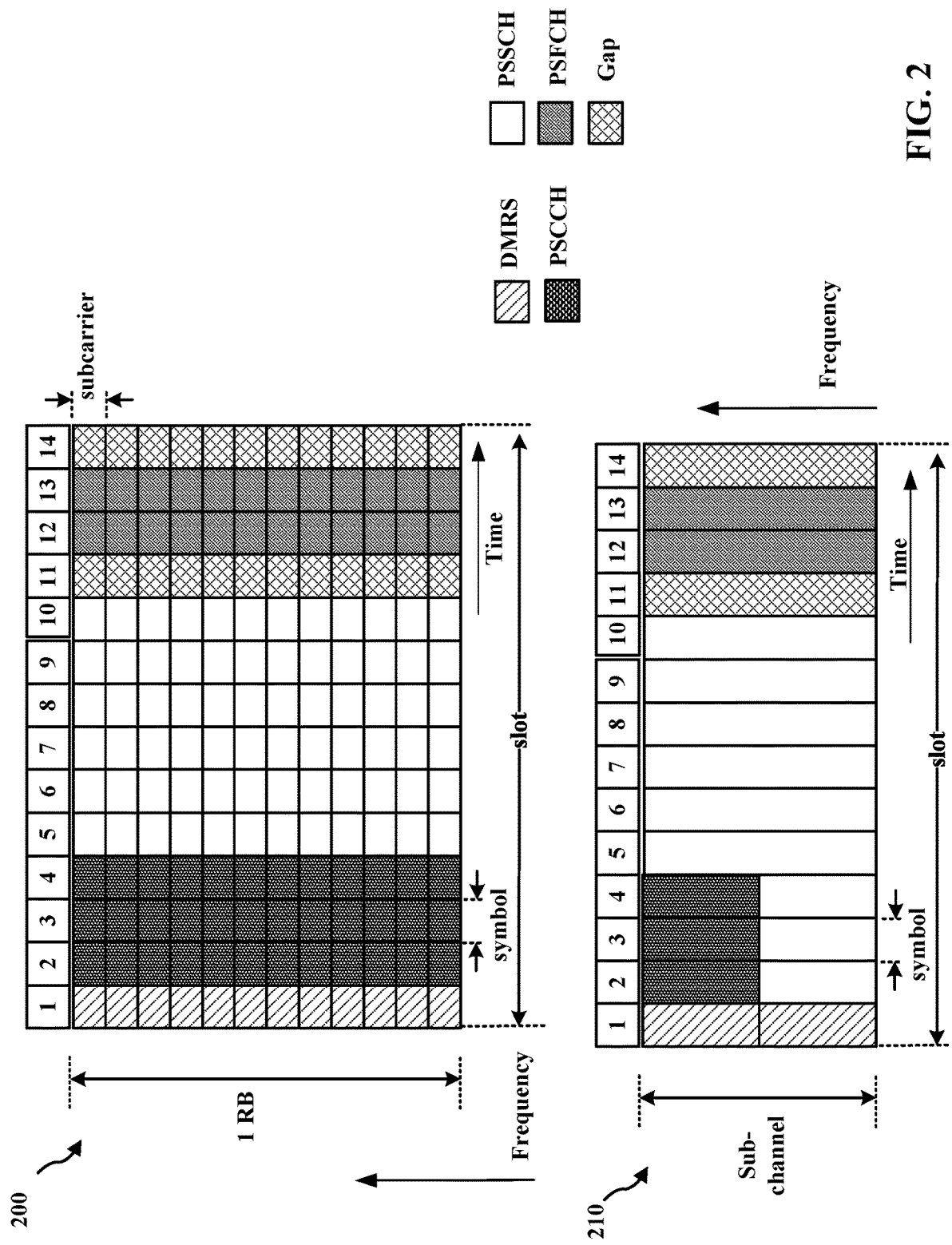
FIG. 2 illustrates example aspects of a sidelink slot structure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include control information in PSCCH and some REs may include demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some aspects.

Figure 3:
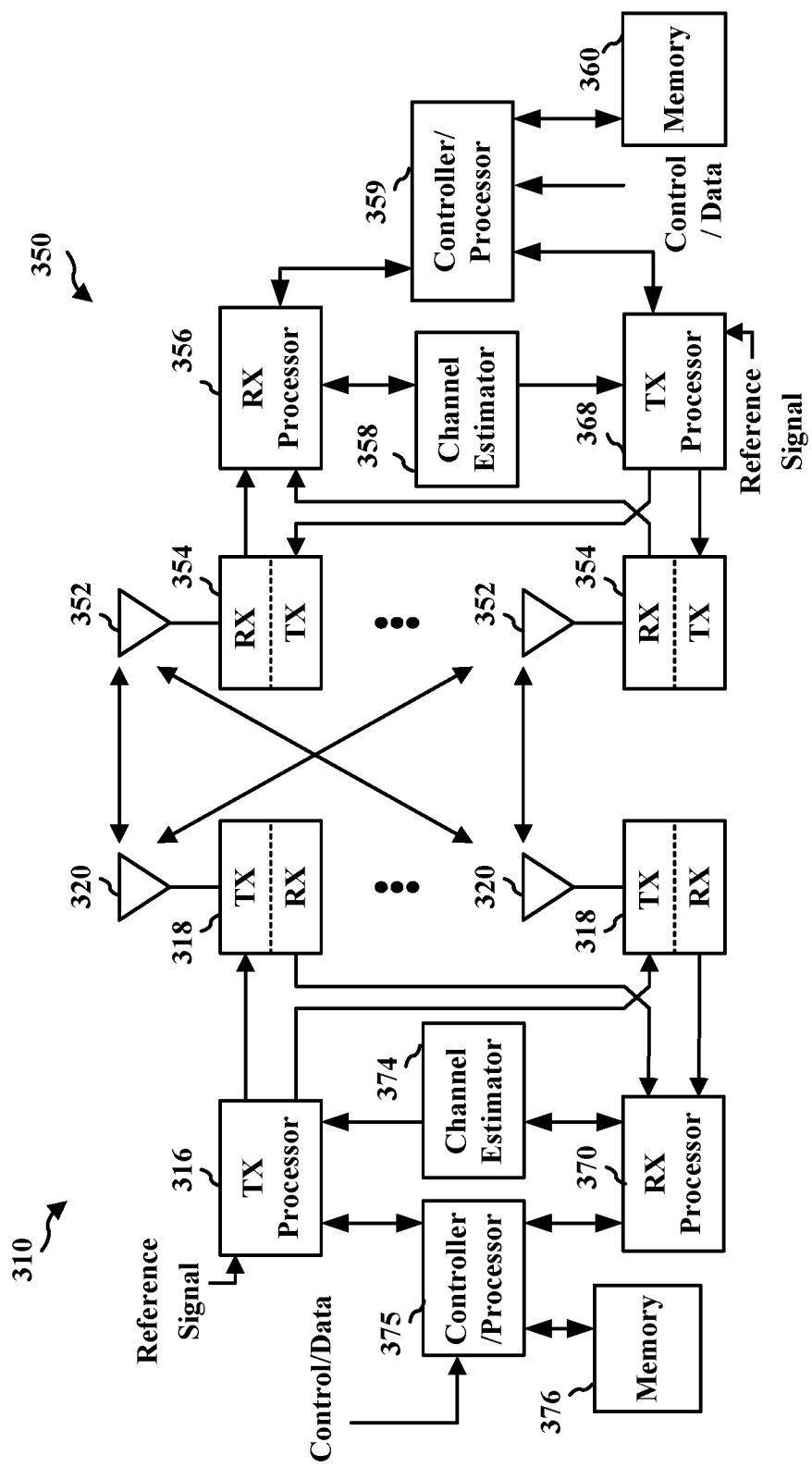
FIG. 3 is a diagram illustrating an example of a first device and a second device involved in wireless communication based, e.g., on sidelink.

FIG. 3 is a block diagram 300 of a first wireless communication device 310 in communication with a second wireless communication device 350 based on sidelink. In some examples, the devices 310 and 350 may communicate based on V2X or other D2D communication. The communication may be based on sidelink using a PC5 interface. The devices 310 and the 350 may comprise a UE, an RSU, a base station, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, and the controller/processor 359 may be configured to perform aspects in connection with the sidelink component 198/199 of FIG. 1.

Figure 4:
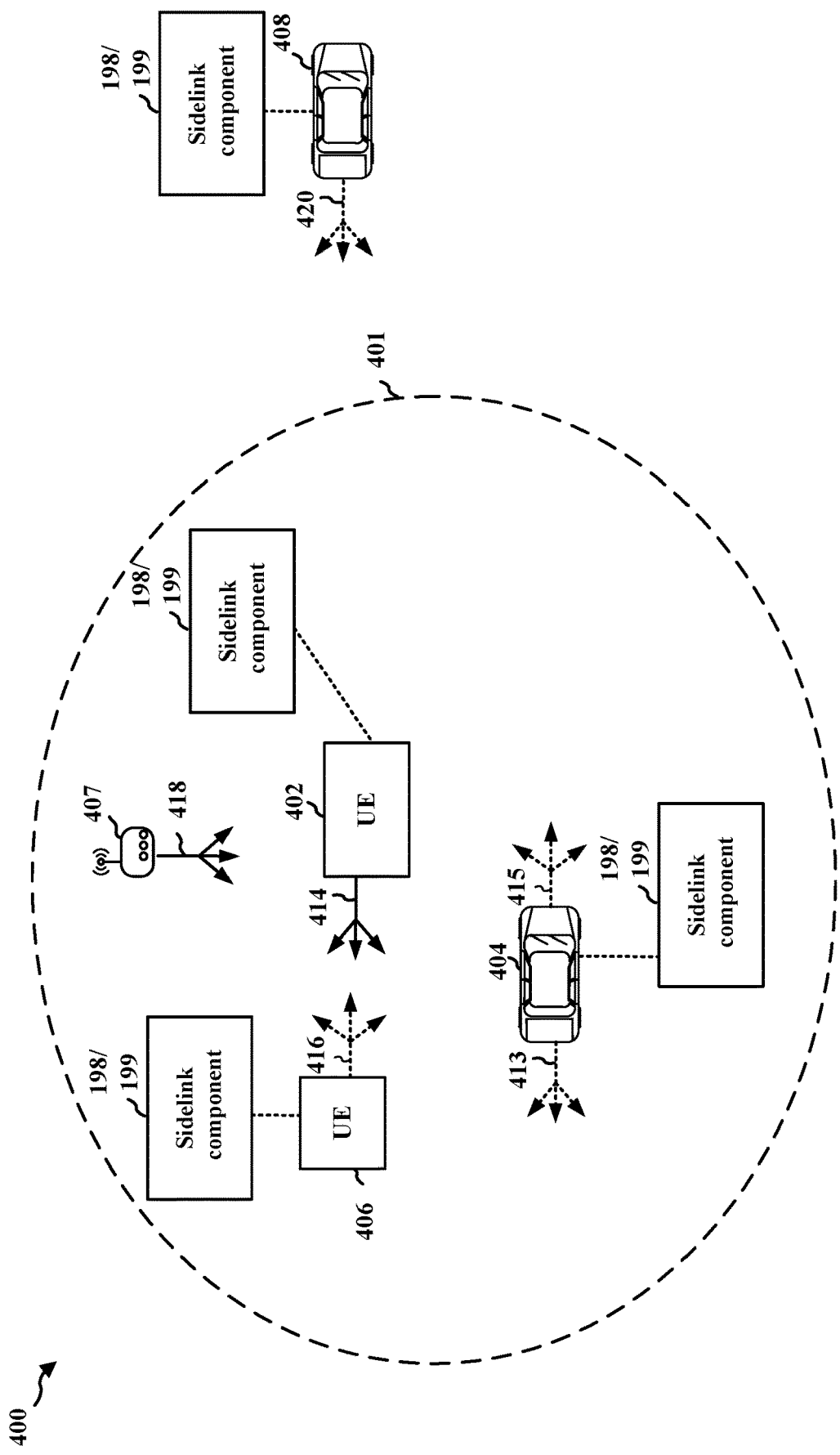
FIG. 4 illustrates example aspects of sidelink communication between devices, in accordance with aspects presented herein.

FIG. 4 illustrates an example 400 of sidelink communication between devices. The communication may be based on a slot structure including aspects described in connection with FIG. 2. For example, the UE 402 may transmit a sidelink transmission 414, e.g., including a control channel (e.g., PSCCH) and/or a corresponding data channel (e.g., PSSCH), that may be received by UEs 404, 406, 408. A control channel may include information (e.g., sidelink control information (SCI)) for decoding the data channel including reservation information, such as information about time and/or frequency resources that are reserved for the data channel transmission. For example, the SCI may indicate a number of TTIs, as well as the RBs that will be occupied by the data transmission. The SCI may also be used by receiving devices to avoid interference by refraining from transmitting on the reserved resources. The UEs 402, 404, 406, 408 may each be capable of sidelink transmission in addition to sidelink reception. Thus, UEs 404, 406, 408 are illustrated as transmitting sidelink transmissions 413, 415, 416, 420. The sidelink transmissions 413, 414, 415, 416, 420 may be unicast, broadcast, or multicast to nearby devices. For example, UE 404 may transmit transmission 413, 415 intended for receipt by other UEs within a range 401 of UE 404, and UE 406 may transmit transmissions 416. Additionally/alternatively, RSU 407 may receive communication from and/or transmit transmission 418 to UEs 402, 404, 406, 408. One or more of the UEs 402, 404, 406, 408 or the RSU 407 may include a sidelink component 198/199 as described in connection with FIG. 1.

Figure 5A:
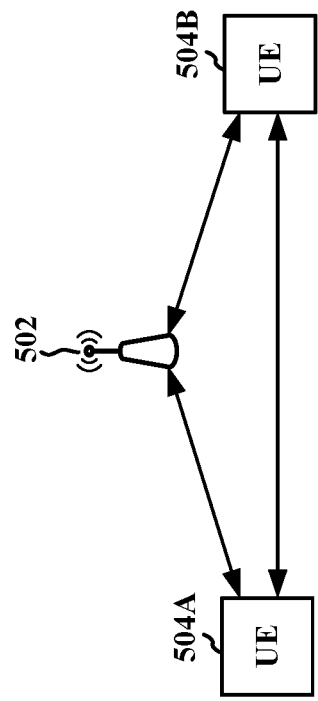
FIGS. 5A and 5B illustrate example aspects of different resource allocation modes for sidelink communication.

Sidelink communication may be based on different types or modes of resource allocation mechanisms. In a first resource allocation mode (which may be referred to herein as "Mode 1"), centralized resource allocation may be provided by a network entity. As illustrated in example 500 of FIG. 5A, a base station 502 may determine resources for sidelink communication and may allocate resources to UEs 504A and 504B to use for sidelink transmissions. In this first mode, the UE 504A or the UE 504B may receive the allocation of sidelink resources from the base station 502 in DCI format 3_0. The DCI may also provide transmission timing. In some aspects, Mode 1 may support dynamic grants (DG), configured grants (CG) type 1, or CG type 2. In CG type 1, the base station may directly provide configured uplink grant via RRC signaling. In CG type 2, the base station may define a periodicity associated with the configured uplink grant and a PDCCH may either signal or activate the configured uplink grant. Modulation and coding scheme (MCS) may be determined by the UE within a range defined by the base station.

In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. Devices communicating based on sidelink may determine one or more radio resources in the time and frequency domain that are used by other devices in order to select transmission resources that avoid collisions with other devices. The sidelink transmission and/or the resource reservation may be periodic or aperiodic, where a UE may reserve resources for transmission in a current slot and up to two future slots (discussed below).

Figure 5B:
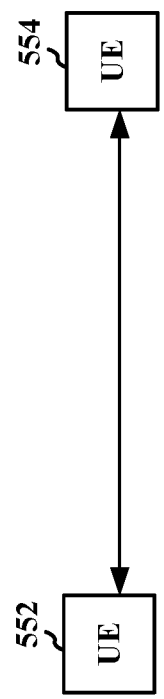

Thus, in the second mode (e.g., Mode 2), individual UEs may autonomously select resources for sidelink transmission, e.g., without a central entity such as a base station indicating the resources for the device. For example, as illustrated in example 550 of FIG. 5B, a UE 552 may reserve the selected resources in order to inform other UEs, including the UE 554, about the resources that the UE 552 intends to use for sidelink transmission(s), such as a transmission between the UE 552 and the UE 554.

In some examples, the resource selection for sidelink communication may be based on a sensing-based mechanism. For instance, before selecting a resource for a data transmission, a UE may first determine whether resources have been reserved by other UEs.

For example, as part of a sensing mechanism for resource allocation mode 2, the UE may determine (e.g., sense) whether the selected sidelink resource has been reserved by other UE(s) before selecting a sidelink resource for a data transmission. If the UE determines that the sidelink resource has not been reserved by other UEs, the UE may use the selected sidelink resource for transmitting the data, e.g., in a PSSCH transmission. The UE may estimate or determine which radio resources (e.g., sidelink resources) may be in-use and/or reserved by others by detecting and decoding sidelink control information (SCI) transmitted by other UEs. The UE may use a sensing-based resource selection algorithm to estimate or determine which radio resources are in-use and/or reserved by others. The UE may receive SCI from another UE that includes reservation information based on a resource reservation field included in the SCI. The UE may continuously monitor for (i.e., sense) and decode SCI from peer UEs. The SCI may include reservation information, e.g., indicating slots and RBs that a particular UE has selected for a future transmission. The UE may exclude resources that are used and/or reserved by other UEs from a set of candidate resources for sidelink transmission by the UE, and the UE may select/reserve resources for a sidelink transmission from the resources that are unused and therefore form the set of candidate resources. The UE may continuously perform sensing for SCI with resource reservations in order to maintain a set of candidate resources from which the UE may select one or more resources for a sidelink transmission. Once the UE selects a candidate resource, the UE may transmit SCI indicating its own reservation of the resource for a sidelink transmission. The number of resources (e.g., sub-channels per subframe) reserved by the UE may depend on the size of data to be transmitted by the UE. Although the example is described for a UE receiving reservations from another UE, the reservations may also be received from an RSU or other device communicating based on sidelink.

An SCI may be transmitted in PSSCH or PSCCH. For example, an SCI stage 1-A may be transmitted in PSCCH and may be decoded by a receiving UE to allow channel sensing and avoid resource collisions. The SCI stage 1-A may be associated with 3 bits representing priority. The SCI stage 1-A may also include frequency resource assignment and associated bits based on a number of slot reservations and a number of subchannels. The SCI stage 1-A may also include time resource assignments, such as 5 or 9 bits representing 2 or 3 reservations. The SCI stage 1-A may further include a DM-RS associated with one or more bits based on a number of configured DM-RS patterns. The SCI stage 1-A may also include one or more bits, such as 5 bits, representing MCS. The SCI stage 1-A may also include one or more bits, such as 2 bits, representing an applicable MCS table. The SCI stage 1-A may also include a PSFCH overhead indicator in the form of zero or more bits. An SCI stage 2 may be transmitted in PSSCH and may be used for decoding PSSCH. The SCI stage 2 may include one or more HARQ IDs associated with one or more bits based on a number of HARQ processes. The SCI stage 2 may also include one or more bits representing a new data indicator (NDI). The SCI stage 2 may also include one or more bits representing a redundancy version identifier (RV-ID). The SCI stage 2 may also include a destination ID or a source ID represented by one or more bits. The SCI stage 2 may also be stage 2-A and further include one or more bits indicating a cast type, such as groupcast, broadcast, or unicast, or one or more bits indicating a CSI request. The SCI stage 2 may also be stage 2-B and further include a zone ID represented by one or more bits and a communication range represented by one or more bits.

Figure 6:
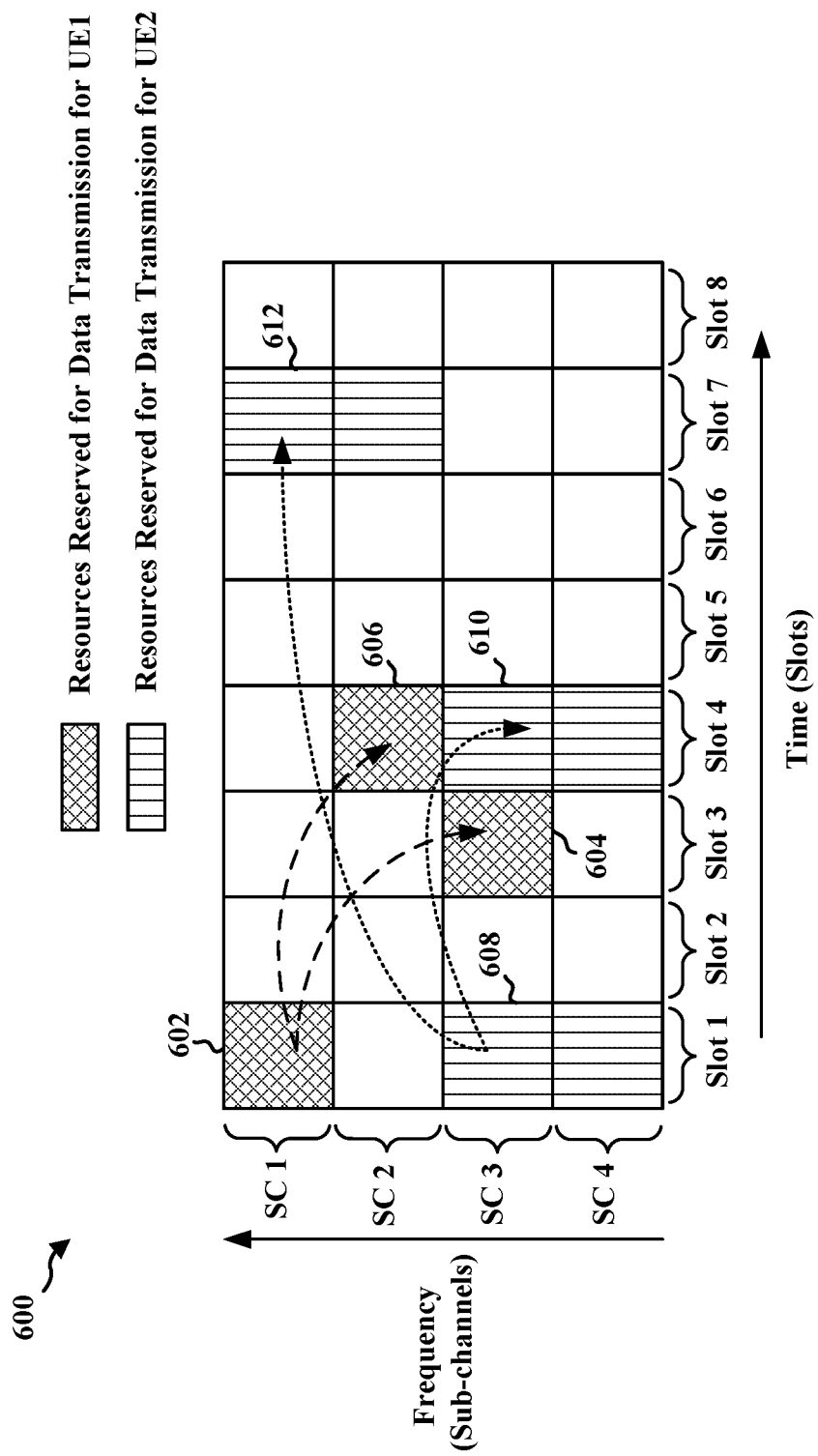
FIG. 6 illustrates examples of resource reservation for sidelink communication.

FIG. 6 is an example 600 of time and frequency resources showing reservations for sidelink transmissions. The resources may be included in a sidelink resource pool, for example. The resource allocation for each UE may be in units of one or more sub-channels in the frequency domain (e.g., sub-channels SC1 to SC 4), and may be based on one slot in the time domain. The UE may also use resources in the current slot to perform an initial transmission, and may reserve resources in future slots for retransmissions. In this example, two different future slots are being reserved by UE1 and UE2 for retransmissions. The resource reservation may be limited to a window of pre-defined slots and sub-channels, such as a window with 8 time slots by 4 sub-channels, as shown in example 600, which provides 32 available resource blocks in total. This window may also be referred to as a resource selection window.

A first UE (UE1) may reserve a sub-channel (e.g., SC 1) in a current slot (e.g., slot 1) for its initial data transmission 602, and may reserve additional future slots within the window for data retransmissions (e.g., 604 and 606). For example, UE1 may reserve sub-channels SC 3 at slots 3 and SC 2 at slot 4 for future retransmissions as shown by FIG. 4. UE1 then transmits information regarding which resources are being used and/or reserved by it to other UE(s). UE1 may do so by including the reservation information in the reservation resource field of the SCI, e.g., a first stage SCI.

FIG. 6 illustrates that a second UE (UE2) reserves resources in sub-channels SC 3 and SC 4 at time slot 1 for its current data transmission 608, and reserves first data retransmission 610 at time slot 4 using sub-channels SC 3 and SC 4, and reserves second data retransmission 612 at time slot 7 using sub-channels SC 1 and SC 2 as shown by FIG. 6. Similarly, UE2 may transmit the resource usage and reservation information to other UE(s), such as using the reservation resource field in SCI.

A third UE may consider resources reserved by other UEs within the resource selection window to select resources to transmit its data. The third UE may first decode SCIS within a time period to identify which resources are available (e.g., candidate resources). For example, the third UE may exclude the resources reserved by UE1 and UE2 and may select other available sub-channels and time slots from the candidate resources for its transmission and retransmissions, which may be based on a number of adjacent sub-channels in which the data (e.g., packet) to be transmitted can fit.

The UE may determine an associated signal measurement (such as RSRP) for each resource reservation received by another UE. The UE may consider resources reserved in a transmission for which the UE measures an RSRP below a threshold to be available for use by the UE. A UE may perform signal/channel measurement for a sidelink resource that has been reserved and/or used by other UE(s), such as by measuring the RSRP of the message (e.g., the SCI) that reserves the sidelink resource. Based at least in part on the signal/channel measurement, the UE may consider using/reusing the sidelink resource that has been reserved by other UE(s). For example, the UE may exclude the reserved resources from a candidate resource set if the measured RSRP meets or exceeds the threshold, and the UE may consider a reserved resource to be available if the measured RSRP for the message reserving the resource is below the threshold. The UE may include the resources in the candidate resources set and may use/reuse such reserved resources when the message reserving the resources has an RSRP below the threshold, because the low RSRP indicates that the other UE is distant and a reuse of the resources is less likely to cause interference to that UE. A higher RSRP indicates that the transmitting UE that reserved the resources is potentially closer to the UE and may experience higher levels of interference if the UE selected the same resources.

For example, in a first step, the UE may determine a set of candidate resources (e.g., by monitoring SCI from other UEs and removing resources from the set of candidate resources that are reserved by other UEs in a signal for which the UE measures an RSRP above a threshold value). In a second step, the UE may select N resources for transmissions and/or retransmissions of a TB. As an example, the UE may randomly select the N resources from the set of candidate resources determined in the first step. In a third step, for each transmission, the UE may reserve future time and frequency resources for an initial transmission and up to two retransmissions. The UE may reserve the resources by transmitting SCI indicating the resource reservation. For example, in the example in FIG. 6, the UE may transmit SCI reserving resources for data transmission 608, data retransmission 610, and data retransmission 612.

Figure 7:
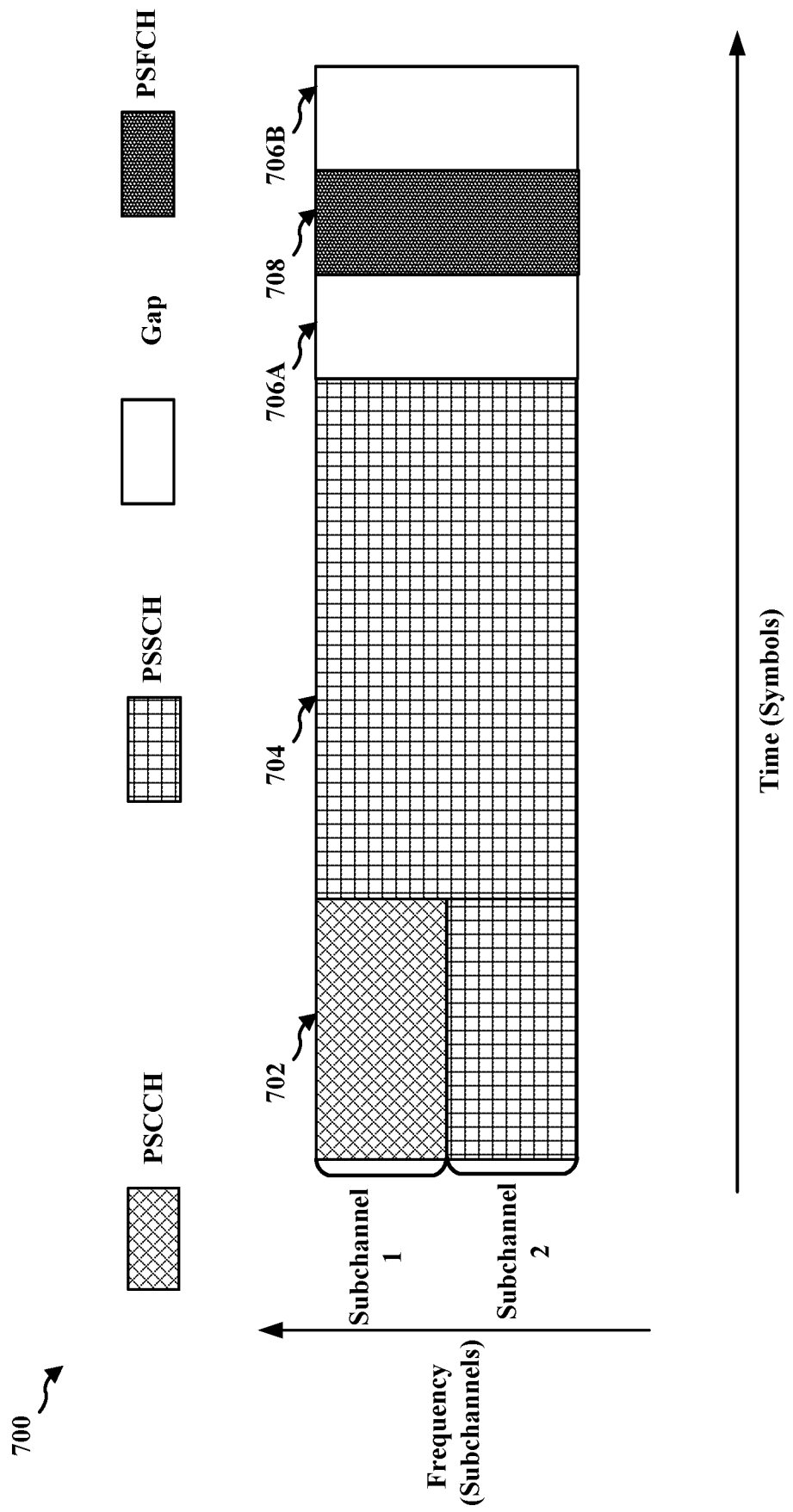
FIG. 7 illustrates an example sidelink transmission.

Sidelink communications may be used in connection with a variety of applications. For example, sidelink communications may be used in connection with C-V2X. In C-V2X, to receive sidelink packets, a receiving UE may perform blind decoding in all sidelink subchannels. The number of subchannels may be small, such as between 1 to 27 subchannels, to make the blind decoding more efficient. A PSCCH and a PSSCH may be transmitted within a same slot. The PSSCH may occupy up to $N_{subchannel}^{SL}$ contiguous subchannels. The PSCCH may occupy up to one subchannel with the lowest subchannel index. An SCI stage 1 may be transmitted in PSCCH containing information about PSSCH bandwidth and resource reservations in future slots. An SCI stage 2 may be found and decoded after decoding a PSCCH. The source ID and destination ID may be used to distinguish whether the packet is for the receiving UE and the transmitting UE that transmitted the packet. Subchannel size may be larger than a threshold, such as larger than 10 RBs. In C-V2X, all UEs may decode transmissions and may blindly decode transmissions. FIG. 7 illustrates an example sidelink transmission 700 including a PSCCH 702, a PSSCH 704, and gaps 706A and 706B around a PSFCH 708. As one example, SCI stage 1 in PSCCH may include a frequency domain resource allocation including $$\left\lceil \log \frac{N_{subchannel}^{SL}(N_{subchannel}^{SL}+1)}{2} \right\rceil$$

bits for 2 reservations, or $$\left\lceil \log \frac{N_{subchannel}^{SL}(N_{subchannel}^{SL}+1)(2N_{subchannel}^{SL}+1)}{6} \right\rceil$$

bits for 3 reservations. As previously described, the SCI stage 1 may include 5 bits for 2 reservations or 9 bits for 3 reservations for time domain resource allocation.

The PSCCH 702 may be configured to occupy {10, 12, 15, 20, 25} PRBs in a single sub-channel. The PSCCH 702 may have a duration configured to 2 or 3 symbols. A sub-channel may occupy {10, 15, 20, 25, 50, 75, 100} PRBs. The size of the PSCCH 702 may be fixed for a resource pool and may be 10% to 100% of one subchannel based on a configuration. The PSSCH 704 may occupy at least one subchannel and may include SCI stage 2.

Sidelink communications may also be used in connection with industrial IoT (IIoT). Sidelink communications may enable direct programmable logical controller (PLC) and sensors/actuators (SAs) communications. Such wireless communications may enable wireless PLC, which may, in turn, enable flexible and simple deployment. Each PLC may control a number of SAs, e.g., 20-50 SAs. The error rate specification may be small, such as $10^{-6}$ error rate, and the latency specification may be tight, such as 1 to 2 ms. Therefore, direct communication between PLC and SAs independent of a base station may be used to reduce latency. IIoT traffic may be associated with a low bandwidth.

To better support URLLC traffic, uplink cancellation indication (ULCI) may be used in some wireless communication systems. For example, a scheduled PUSCH resource may be canceled based on a ULCI. Such cancellation mechanism may be used to enhance UL URLLC latency performance. The ULCI may be provided via a PDCCH, such as a groupcast PDCCH associated with DCI format 2_4 using cancellation indication RNTI (CI-RNTI). Different formats of DCI may provide different scheduling. For example, DCI format 0_0 may be a fallback format that may provide scheduling of a PUSCH in one cell. DCI format 0_1 may be a non-fallback format that may provide scheduling of a PUSCH in one cell. DCI format 1_0 may be a fallback DCI format used for allocating downlink resources for a PDSCH. DCI format 1_1 may be a non-fallback DCI format used for allocating downlink resources for a PDSCH. DCI format 2_0 may be used for the notification of slot format information (to dynamically change the slot format). DCI format 2_1 may be used for notifying the PRB(s) and OFDM symbol(s) where a UE may assume no transmission is intended for the UE. DCI format 2_2 may be used for the transmission of transmit power control (TPC) commands for a PUCCH and a PUSCH. DCI format 2_3 may be used for the transmission of a group of TPC commands for SRS transmissions by one or more UEs. DCI format 2_4 may be used for, such as dedicated for, providing cancellation of a UL transmission.

Figure 8:
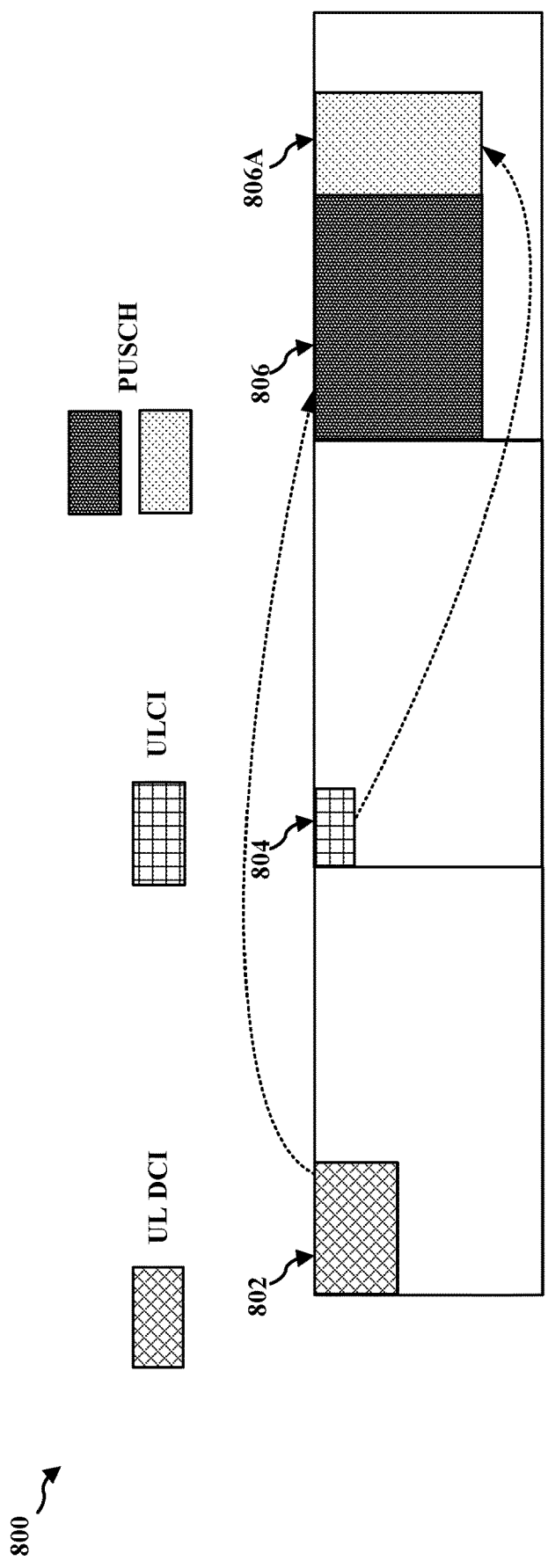
FIG. 8 illustrates example uplink cancellation indication (ULCI).

FIG. 8 is a diagram 800 illustrating an example ULCI. As illustrated in FIG. 8, a base station may transmit UL DCI 802 scheduling a PUSCH 806 to a UE. Based on a high priority (HP) transmission, the base station may transmit a ULCI 804 cancelling a portion 806A of the PUSCH 806 that may use the same time and frequency resources as the HP transmission.

Figure 9:
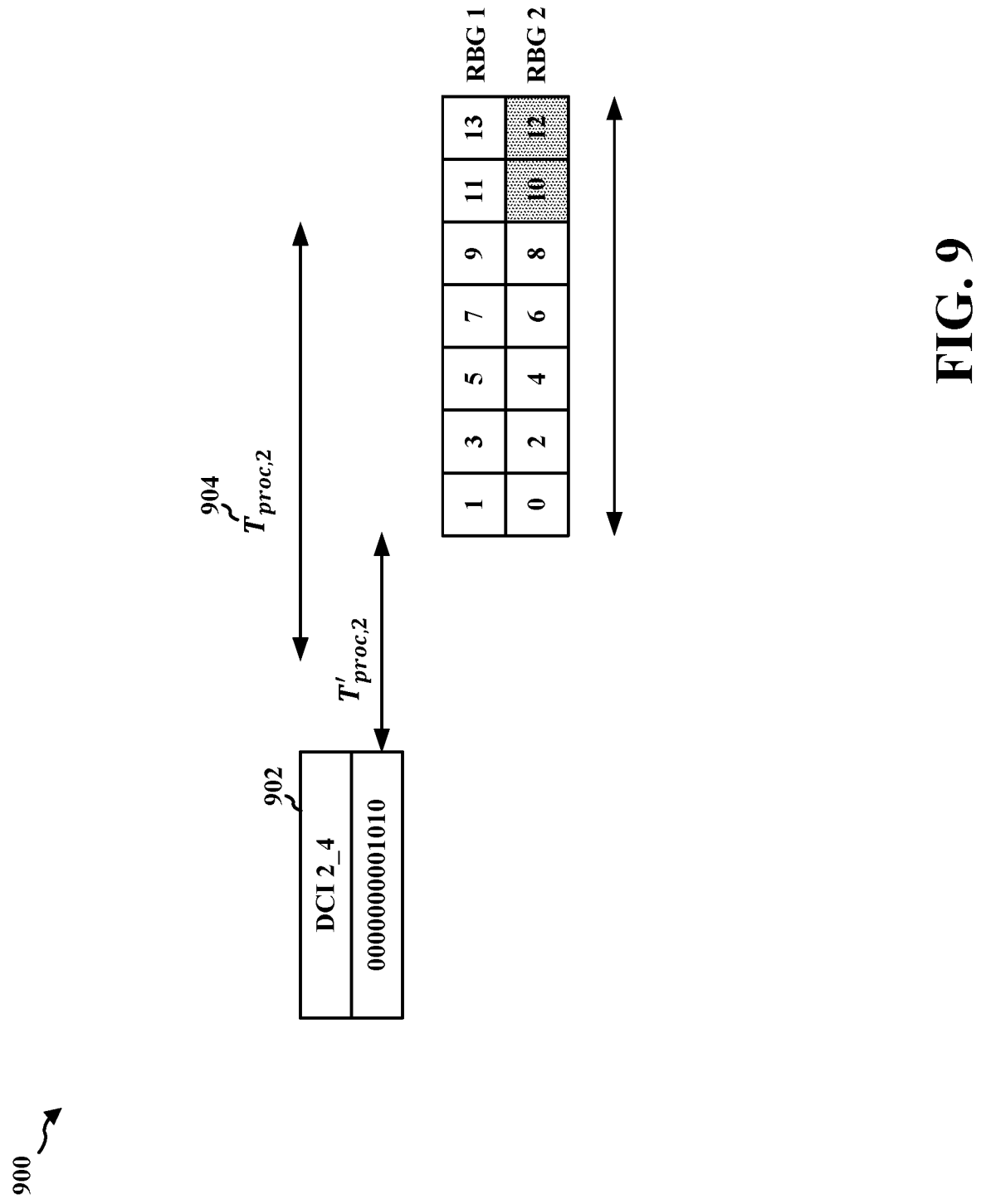
FIG. 9 illustrates example ULCI and associated payload.

FIG. 9 is a diagram 900 illustrating an example ULCI and associated payload. As illustrated in FIG. 9, the ULCI may be provided via a DCI 902 of format 2_4. The DCI 902 may include one or more bits mapped to one or more RBs in two different RBGs, e.g., RBG 1 and RBG 2. In the illustrated example, the DCI 902 may include 14 bits per serving cell mapped to 14 RBs. Time and frequency resource region associated with the 14 RBs may be RRC configured. A payload may indicate what portion of time and frequency resource may be canceled. The ULCI may be further associated with a CI-RNTI, a CI configuration per serving cell, a position in DCI, or a payload size for CI. A UE may not cancel a symbol starting earlier than $T_{proc,2}$ 904 after the last symbol of a control resource set (CORESET) detecting the DCI 902.

Figure 10:
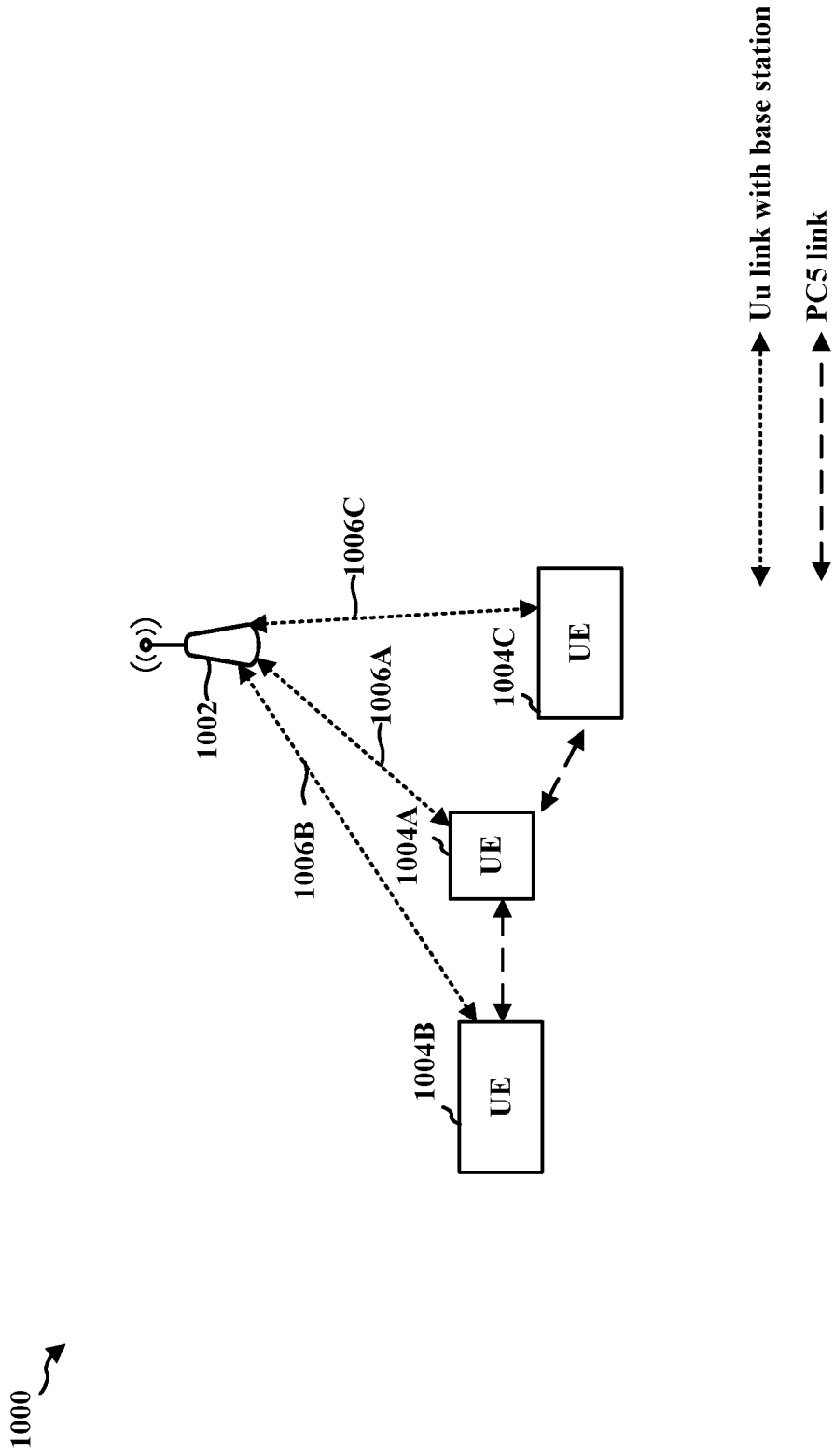
FIG. 10 illustrates example communications including a base station and UEs.

FIG. 10 illustrates an example of wireless communication systems 1000. The wireless communication system 1000 may include a base station 1002 and UEs 1004A, 1004B, and 1004C. In the illustrated example, the base station 1002 may establish respective communication links 1006A, 1006B, and 1006C with the UEs 1004A, 1004B, and 1004C. In some aspects, the UE 1004A may be a PLC and the UEs 1004B and 1004C may be SAs. In some aspects, the base station 1002 may schedule sidelink communications via a DCI, such as a DCI of format 3_0. The sidelink communication may be a sidelink transmission from a transmitting UE to a receiving UE using a PSCCH or a PSSCH. The DCI of format 3_0 may indicate a set of time/frequency resources to be used for the PSCCH or the PSSCH.

In some wireless communication systems, scheduled sidelink transmissions cannot be canceled by using DCI. Therefore, a base station may not schedule an HP transmission, such as a URLLC transmission, using resources already scheduled for a low priority (LP) transmission. Aspects provided herein support soft cancellation for sidelink transmissions which may improve latency performance, reliability, and throughput in communication systems, such as communication systems with URLLC. In a wireless communication system, an HP sidelink or non-sidelink transmission may be scheduled after an LP sidelink transmission is already scheduled. The HP sidelink or non-sidelink transmission use time and frequency resources that may overlap with at least a portion of the LP sidelink transmission. Aspects provided herein may enable a base station to indicate a soft cancellation to a transmitting UE of the LP sidelink transmission, so that the transmitting UE may cancel or reduce transmit power of the LP sidelink transmission based on an interference to the HP sidelink or non-sidelink transmission. By enabling the flexibility of canceling or reducing the transmit power, the potential interference between the LP transmission and the HP sidelink or non-sidelink transmission may be more efficiently resolved. In some aspects, a base station may soft cancel (e.g., instruct a transmitting UE to cancel or reduce transmit power based on interference) an LP sidelink transmission for non-sidelink HP traffic. In some aspects, a base station may soft cancel (e.g., instruct a transmitting UE to cancel or reduce transmit power based on interference) an LP sidelink transmission for sidelink HP traffic. In some aspects, a base station may soft cancel an SL retransmission.

In some aspects, a base station may soft cancel a scheduled SL transmission in an SL channel by transmitting an SLCI carried by a DCI to a transmitting UE. The SLCI/DCI may be associated with an instruction to reduce transmit power on a scheduled PSSCH or a scheduled PSCCH. For example, the instruction to reduce transmit power may be associated with an instruction to change an open loop power control (OLPC) parameter, a maximum transmit power indication, or an instruction to change a closed loop power control (CLPC) parameter. The transmitting UE may accordingly reduce transmit power of the scheduled SL transmission. If the reduced transmit power of the scheduled SL transmission is insufficient, the transmitting UE may cancel the scheduled SL transmission. For example, the transmitting UE may cancel or reduce transmit power on all symbols in the scheduled SL transmission without resumption. In another example, the transmitting UE may cancel or reduce the transmit power on a set of overlapping symbols that overlaps with HP traffic and resumes the transmission on non-overlapping symbols (may be after a gap). In another example, the transmitting UE may cancel transmission or reduce transmit power on all allocated resources. In another example, the transmitting UE may cancel a transmission or cancel/reduce the transmit power on a set of overlapping symbols that overlaps with HP traffic and resumes the transmission on non-overlapping symbols (may be after a gap) with an additional RS, such as an additional RS for estimating phase jump.

Figure 11:
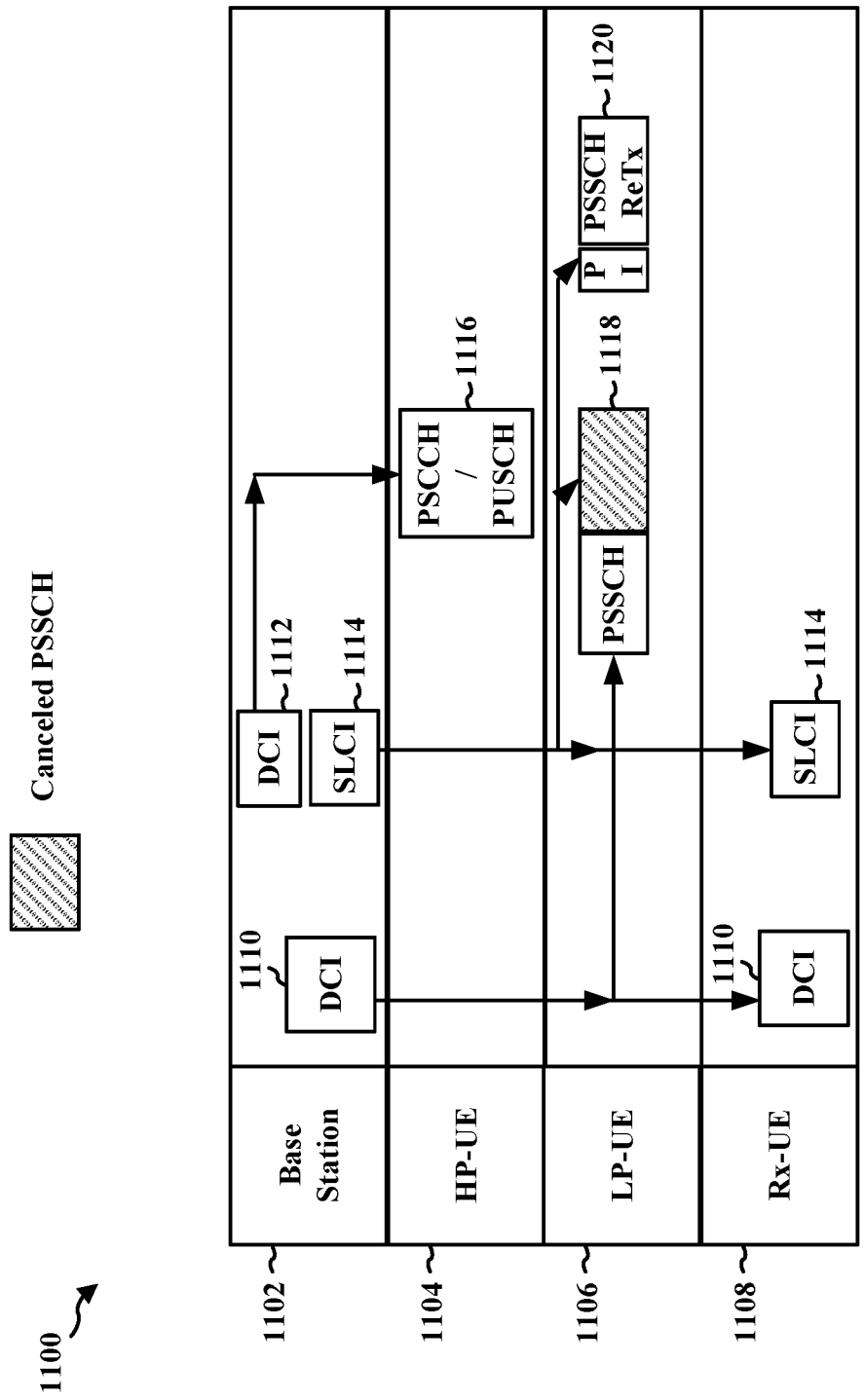
FIG. 11 illustrates example sidelink cancellation indication (SLCI).

FIG. 11 is a diagram 1100 illustrating example SLCI. As illustrated in FIG. 11, a base station 1102 may transmit a DCI 1110 scheduling a PSSCH 1118 to an LP UE 1106. The DCI 1110 may also be transmitted to the receiving UE 1108 of the PSSCH 1118. The base station 1102 may then transmit a DCI 1112 to schedule a PSCCH or a PUSCH 1116 for an HP UE 1104. The PSCCH or the PUSCH 1116 may use time and frequency resources that may overlap with the PSSCH 1118. Because traffic of the HP UE 1104 is HP, the base station may cancel or soft cancel the PSSCH 1118 by transmitting an SLCI 1114 in another DCI to the LP UE 1106. The SLCI 1114 may also be transmitted to the receiving UE 1108. Based on the SLCI 1114, a portion of PSSCH 1118 may be canceled or transmitted with a reduced transmit power. In some aspects, the canceled portion may be transmitted in a PSSCH retransmission 1120.

Figure 12:
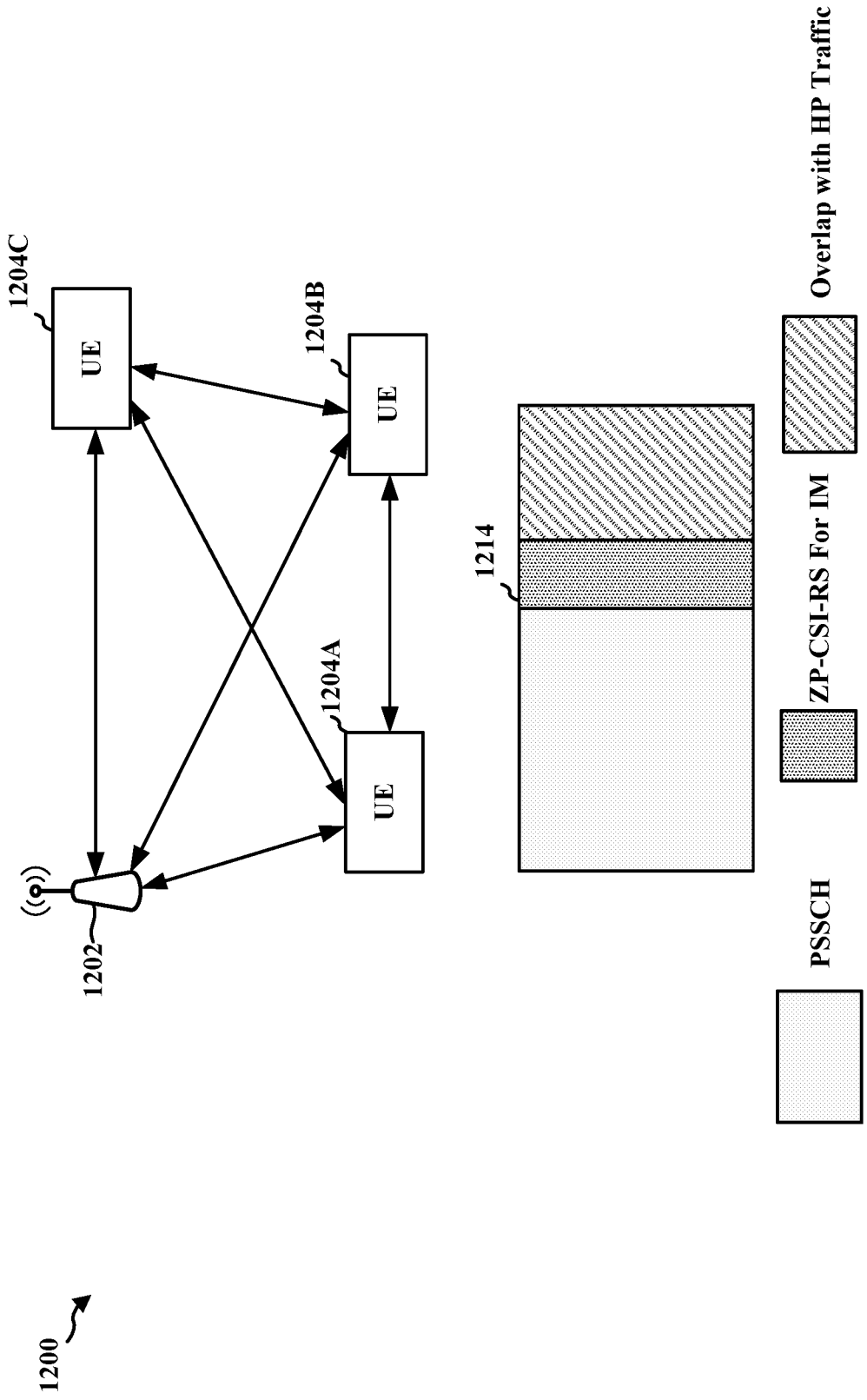
FIG. 12 illustrates example communications including a base station and UEs.

FIG. 12 is a diagram 1200 illustrating example communications including a base station 1202 and UEs 1204A, 1204B, and 1204C. In some aspects, the UE 1204A may be a transmitting UE of an HP transmission. In some aspects, the UE 1204B may be a transmitting UE of an LP sidelink transmission. In some aspects, the UE 1204C may be a receiving UE of the LP sidelink transmission. The base station 1202 may be the recipient of the HP transmission. The base station 1202 may transmit an SLCI to soft cancel the LP sidelink transmission.

In some aspects, signal-to-interference and noise ratio (SINR) for the HP transmission at the base station 1202 may be denoted by $$\frac{P_{11}}{P_{12}+N0}.$$

The SINR tor the LP transmission at the UE 1204C may be denoted by $$\frac{P_{22}}{P_{21}+N0}.$$

The parameter N0 may denote noise in the environment, the parameter $P_{22}$ may denote the transmit power of the LP transmission, the parameter $P_{11}$ may denote transmit power of the HP transmission, the parameter $P_{12}$ may denote radiated power of the LP transmission at the base station 1202, and the $P_{21}$ may denote radiated power of the HP transmission at the UE 1204C.

Figure 13:
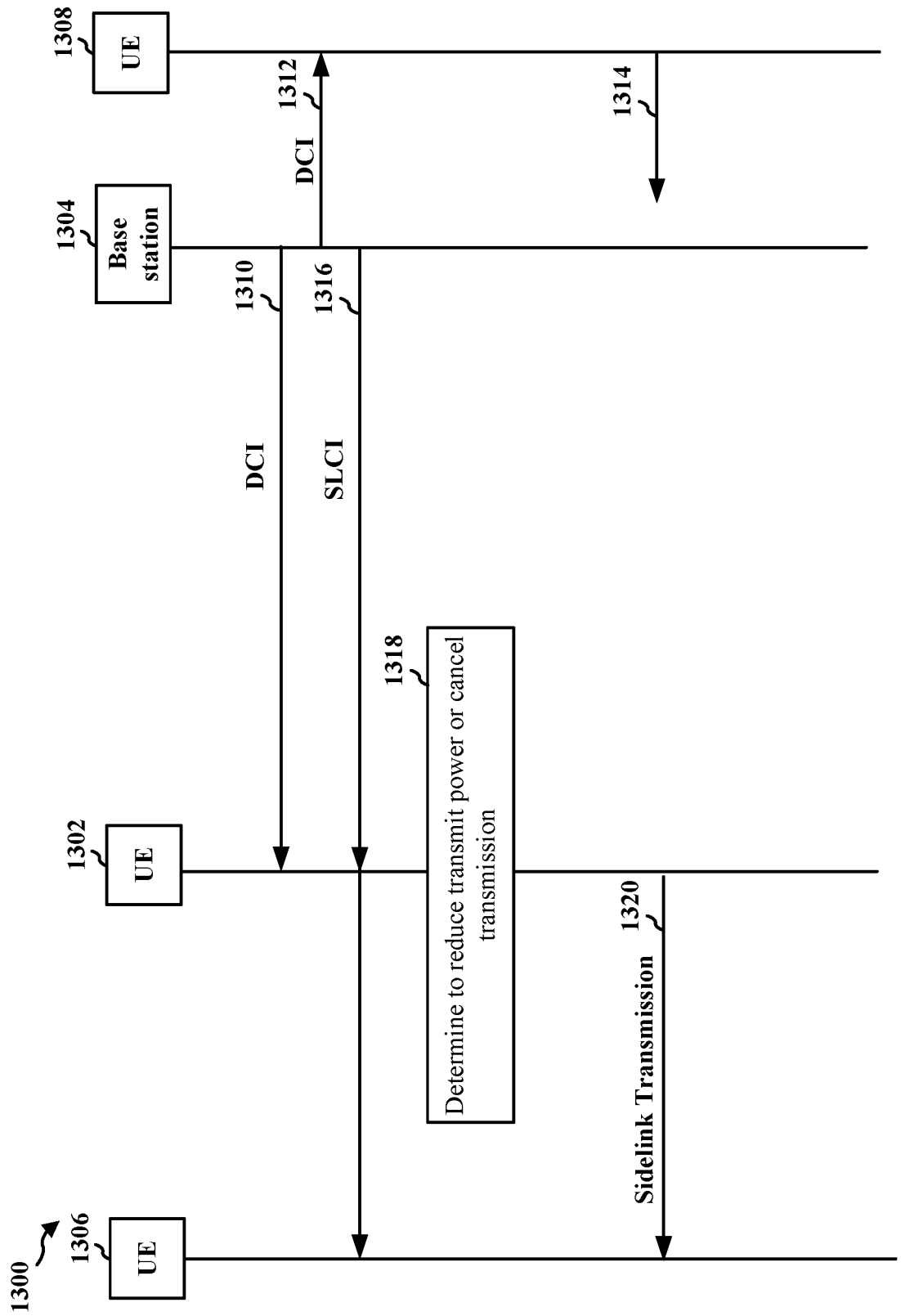
FIG. 13 illustrates an example communication flow between devices communicating based on sidelink communication.

FIG. 13 illustrates an example communication flow 1300 between devices communicating based on sidelink communication. The UE 1302 in FIG. 13 may correspond with the UE 1204B in FIG. 12, which may be an LP UE, the base station 1304 in FIG. 13 may correspond with the base station 1202 in FIG. 12, the UE 1306 in FIG. 13 may correspond with the UE 1204C in FIG. 12 which may be a receiving UE, and the UE 1308 may correspond with the UE 1204A in FIG. 12 which may be an HP UE. As illustrated in FIG. 13, the base station 1304 may transmit a DCI 1310 scheduling a sidelink transmission 1320 from the UE 1302 to the UE 1306. At some time after transmitting the DCI 1310, the base station 1304 may transmit a DCI 1312 to the UE 1308 scheduling a non-sidelink or sidelink transmission 1314. The non-sidelink or sidelink transmission 1314 may use time and frequency resources that may overlap with time and frequency resources for the sidelink transmission 1320 scheduled in DCI 1310. The base station 1304 may then transmit an SLCI 1316, carried in DCI, to the UE 1302 to soft cancel the sidelink transmission 1320. At 1318, based on the SLCI 1316, the UE 1302 may determine to reduce the transmit power or cancel the sidelink transmission 1320.

In some aspects, the UE 1302 may measure interference level from the UE 1308. For example, the UE 1302 may pause sidelink transmission 1320 on overlapping symbols (that overlap with the transmission 1314), e.g., for a fractional to a number of symbol time to measure interference. The base station 1304 may define a minimum interference measurement (IM) time for the UE 1302. The measurement time may depend on the length of the overlapping region of the time and frequency resources for the transmission 1314 and the sidelink transmission 1320. In some aspects, if the overlapping region is smaller than a time threshold, there may be no measurement time.

The UE 1302 may measure a received signal strength indicator (RSSI) of the transmission 1314. In some aspects, the base station 1304 may provide the UE 1302 with DM-RS associated with the transmission 1314. In some aspects, the UE 1302 may also measure a reference signal receive power (RSRP) associated with the transmission 1314 based on the DM-RS. In some aspects, the UE 1302 may measure RSSI on overlapping and non-overlapping regions. If the RSSI on overlapping regions is greater than the RSSI on the non-overlapping region by a threshold, the UE 1302 may determine that the transmission 1314 and the sidelink transmission 1320 may be near and recipients may experience high interference. If the RSSI on overlapping regions is small, the UE 1302 may determine that the interference may be acceptable. The UE 1302 may determine whether SINR with a reduced transmit power may be sufficient for decoding for the UE 1306, and may accordingly transmit the sidelink transmission 1320 after reducing transmit power or cancel the sidelink transmission 1320. Referring back to FIG. 12, in some aspects, zero power (ZP) CSI RS (ZP-CSI-RS) for IM 1214 may be used for IM.

In some aspects, the UE 1302 may determine a transmit power of the sidelink transmission 1320 based on the one or more parameters in the SLCI 1316. The UE 1302 may also determine the transmit power of the sidelink transmission 1320 based on a transmit power of the UE 1308. For example, the transmit power may be $P_t = \min(P_{c,max}, P_{CBR,max}, \min(P_{PSSCH,D}, P_{PSSCH,SL}))$ where $P_{PSSCH,D} = P_{c,max} + 10 \log_{10}(2^\mu \cdot M_{RB}^{PSSCH}(i)) + \alpha_D \cdot PL_D$ and similarly for $P_{PSSCH,SL}$. The parameter $P_{c,max}$ may denote a configured maximum UE output power, the parameter $P_{CBR,max}$ may be determined by a configured maximum UE output for sidelink transmission of based on a priority level and a channel busy ratio (CBR) range that includes a CBR measured or may equal to $P_{c,max}$. The parameter $P_{PSSCH,D}$ may be based on $P_{PSSCH,D} = P_{c,max} + 10 \log_{10}(2^\mu \cdot M_{RB}^{PSSCH}(i)) + \alpha_D \cdot PL_D$. The parameter $M_{RB}^{PSSCH}(i)$ may be a number of resource blocks for the PSSCH transmission occasion i and $\mu$. The parameter $a_D$ may be a power control factor. The parameter $PL_D$ may be a pathloss estimate in dB. The parameter $P_{PSSCH,SL}$ may be similarly calculated based on $P_{PSSCH,SL}(i) = P_{O,SL} + 10 \log_{10}(2^\mu \cdot M_{RB}^{PSSCH}(o)) + \alpha_{SL} \cdot PL_{SL}$. The parameter $P_{O,SL}$ may be a P0 for sidelink, $\alpha_{SL}$ may be a power control factor, and $PL_{SL}$ may be a pathloss estimate in dB. Transmit power for a PSCCH may be similarly calculated.

In some aspects, to avoid interference from the UE 1302 to the UE 1308, the UE 1302 may, based on the soft cancellation in SLCI 1316, apply the power control with $P_{PSSCH,D} = P_{c,max} + 10 \log_{10}(2^\mu \cdot M_{RB}^{PSSCH}(i)) + \alpha_D \cdot PL_D - I_{MRG}$. The parameter $I_{MRG}$ may be a power back-off based on an interference provided by the base station 1304 or derived based on the interference measurement. The larger the measured interference, the larger the power back-off and the lower transmit power. In some aspects, the base station 1304 may RRC configure a table to specify a range of interference and the corresponding value of the power back-off $I_{MRG}$. In some aspects, the base station 1304 may further define a maximum transmit power of the sidelink transmission 1320.

Figure 14:
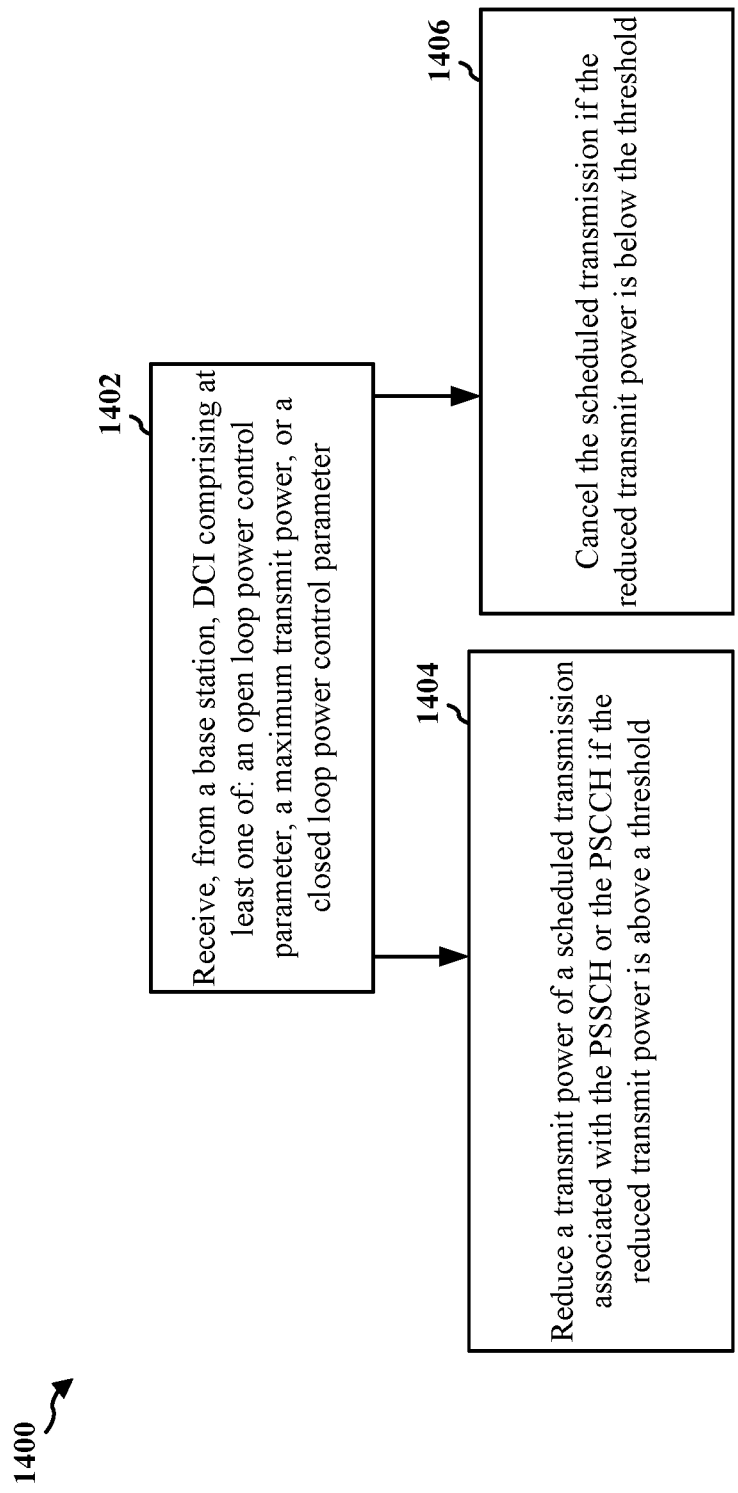
FIG. 14 is a flowchart of a method of wireless communication.

FIG. 14 is a flowchart 1400 of a method of wireless communication. The method may be performed by a UE (e.g., the UE 104, the UE 1302; the apparatus 1602).

At 1402, the UE may receive, from a base station, DCI including at least one of: an open loop power control parameter, a maximum transmit power, or a closed loop power control parameter. The open loop power control parameter, the maximum transmit power, or the closed loop power control parameter may be associated with a PSSCH or a PSCCH. For example, the UE 1302 may receive, from a base station 1304, SLCI 1316 in a DCI including at least one of: an open loop power control parameter, a maximum transmit power, or a closed loop power control parameter. In some aspects, 1402 may be performed by the indication component 1640 in FIG. 16.

At 1404, the UE may reduce a transmit power of a scheduled transmission associated with the PSSCH or the PSCCH to a reduced transmit power if the reduced transmit power may be above a threshold. The reduced transmit power may be based on the open loop power control parameter, the maximum transmit power, or the closed loop power control parameter. For example, the UE 1302 may reduce, at 1318, a transmit power of a scheduled transmission (e.g., the sidelink transmission 1320) associated with the PSSCH or the PSCCH if the reduced transmit power may be above a threshold. In some aspects, 1404 may be performed by the sidelink component 1642 in FIG. 16.

At 1406, the UE may cancel the scheduled transmission if the reduced transmit power may be below the threshold. The reduced transmit power may be based on the open loop power control parameter, the maximum transmit power, or the closed loop power control parameter. For example, the UE 1302 may cancel the scheduled transmission (e.g., the sidelink transmission 1320) if the reduced transmit power may be below the threshold. In some aspects, 1406 may be performed by the sidelink component 1642 in FIG. 16.

Figure 15:
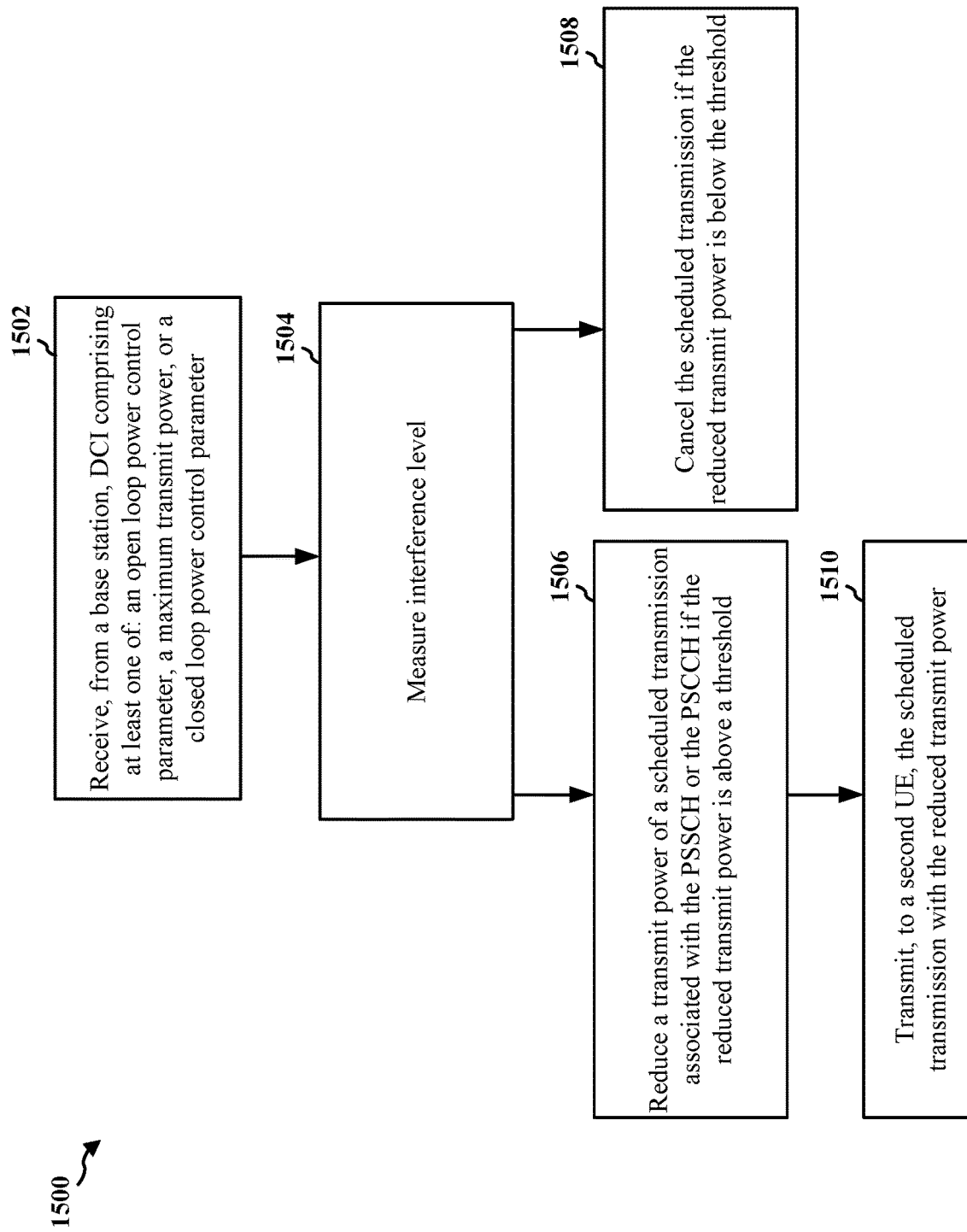
FIG. 15 is a flowchart of a method of wireless communication.

FIG. 15 is a flowchart 1500 of a method of wireless communication. The method may be performed by a UE (e.g., the UE 104, the UE 1302; the apparatus 1602).

At 1502, the UE may receive, from a base station, DCI including at least one of: an open loop power control parameter, a maximum transmit power, or a closed loop power control parameter. The open loop power control parameter, the maximum transmit power, or the closed loop power control parameter may be associated with a PSSCH or a PSCCH. For example, the UE 1302 may receive, from a base station 1304, SLCI 1316 in a DCI including at least one of: an open loop power control parameter, a maximum transmit power, or a closed loop power control parameter. In some aspects, 1502 may be performed by the indication component 1640 in FIG. 16.

At 1504, the UE may measure an interference level. For example, the UE 1302 may measure an interference level as described in connection with FIG. 13. In some aspects, 1504 may be performed by the sidelink component 1642 in FIG. 16. In some aspects, the UE may measure an interference level associated with a transmission from an HP UE for a period of time. The transmission from the HP UE may include an overlap with the scheduled transmission. In some aspects, the threshold may be based on the measured interference level. In some aspects, the overlap may be associated with a ZP-CSI-RS for IM. In some aspects, the period of time may be based on a duration of the overlap or configured by the base station. In some aspects, to measure the interference level, the UE may measure a RSRP or a first RSSI associated with a DM-RS associated with the overlap. A configuration including a sequence form and one or more time and frequency resources associated with the DM-RS may be received from the base station. In some aspects, the UE may measure a second RSSI associated with a non-overlapping region of the transmission from the HP UE with the first RSSI, where the threshold may be based on the second RSSI. In some aspects, the threshold may be associated with a SINR associated with a sufficient power for decoding based on the interference level. In some aspects, the threshold may be within an upper limit or a lower limit configured by the base station.

At 1506, the UE may reduce a transmit power of a scheduled transmission associated with the PSSCH or the PSCCH to a reduced transmit power if the reduced transmit power may be above a threshold. The reduced transmit power may be based on the open loop power control parameter, the maximum transmit power, or the closed loop power control parameter. For example, the UE 1302 may reduce, at 1318, a transmit power of a scheduled transmission (e.g., the sidelink transmission 1320) associated with the PSSCH or the PSCCH if the reduced transmit power may be above a threshold. In some aspects, 1506 may be performed by the sidelink component 1642 in FIG. 16.

In some aspects, to reduce the transmit power, the UE may measure a second transmit power associated with a transmission from an HP UE and calculate the reduced transmit power based on the second transmit power and at least one of the open loop power control parameter, the maximum transmit power, or the closed loop power control parameter. In some aspects, the reduced transmit power may be further based on a number of resource blocks associated with the PSSCH. In some aspects, the reduced transmit power may be further based on a power control factor associated with the PSSCH or the PSCCH. In some aspects, the reduced transmit power may be further based on a measured interference associated with the PSSCH or the PSCCH. In some aspects, the reduced transmit power may be further based on a power back-off.

At 1508, the UE may cancel the scheduled transmission if the reduced transmit power is below the threshold. For example, the UE 1302 may cancel the scheduled transmission (e.g., the sidelink transmission 1320) if the reduced transmit power may be below the threshold. In some aspects, 1508 may be performed by the sidelink component 1642 in FIG. 16.

At 1510, the UE may transmit, to a second UE, the scheduled transmission with the reduced transmit power. For example, the UE 1302 may transmit, to a second UE 1306, the scheduled transmission (e.g., the sidelink transmission 1320) with the reduced transmit power. In some aspects, 1510 may be performed by the sidelink component 1642 in FIG. 16.

Figure 16:
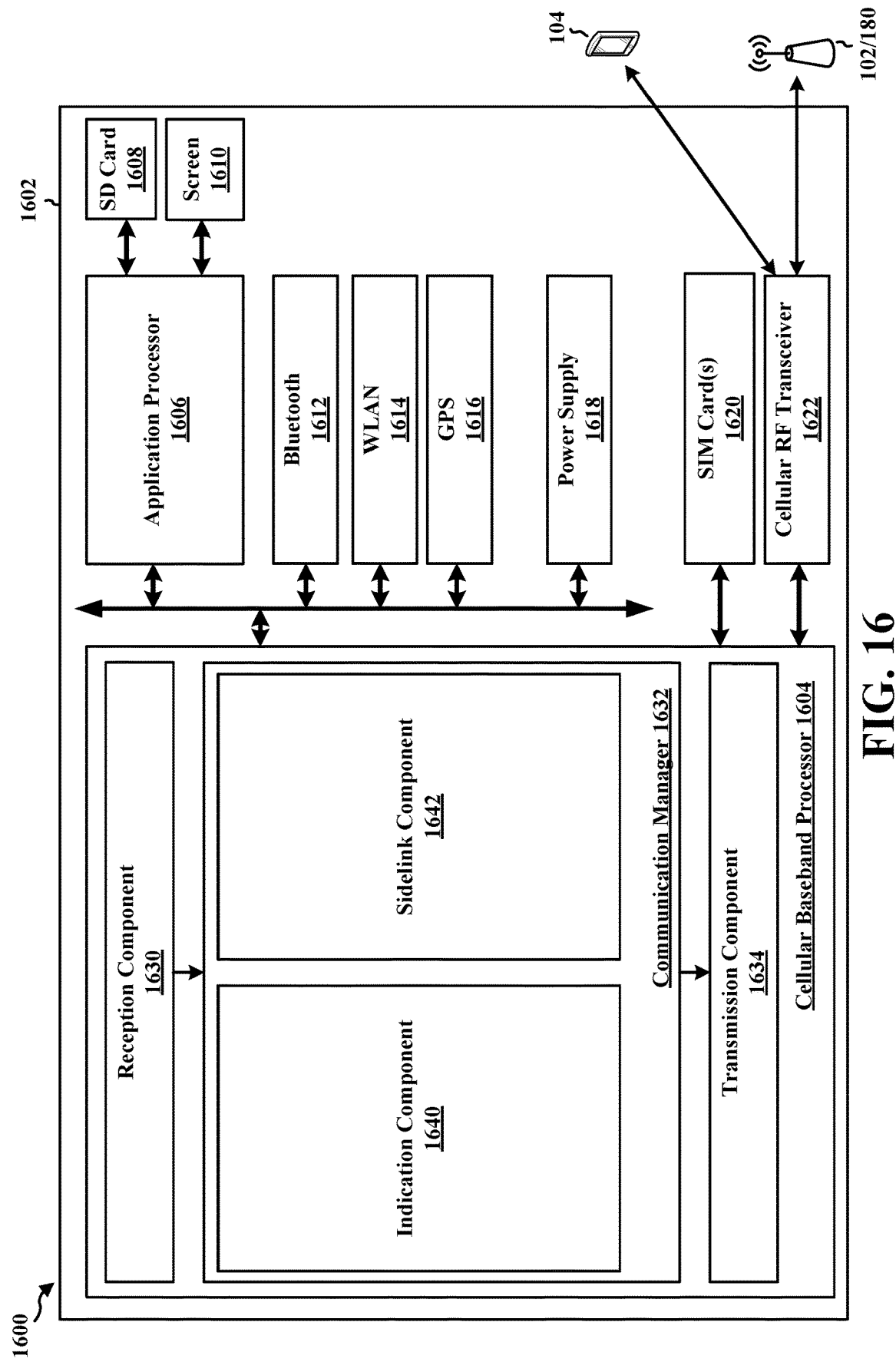
FIG. 16 is a diagram illustrating an example of a hardware implementation for an example apparatus.

FIG. 16 is a diagram 1600 illustrating an example of a hardware implementation for an apparatus 1602. The apparatus 1602 may be a UE, a component of a UE, or may implement UE functionality. In some aspects, the apparatus 1602 may include a cellular baseband processor 1604 (also referred to as a modem) coupled to a cellular RF transceiver 1622. In some aspects, the apparatus 1602 may further include one or more subscriber identity modules (SIM) cards 1620, an application processor 1606 coupled to a secure digital (SD) card 1608 and a screen 1610, a Bluetooth module 1612, a wireless local area network (WLAN) module 1614, a Global Positioning System (GPS) module 1616, or a power supply 1618. The cellular baseband processor 1604 communicates through the cellular RF transceiver 1622 with the UE 104 and/or BS 102/180. The cellular baseband processor 1604 may include a computer-readable medium/memory. The computer-readable medium/memory may be non-transitory. The cellular baseband processor 1604 is responsible for general processing, including the execution of software stored on the computer-readable medium/memory. The software, when executed by the cellular baseband processor 1604, causes the cellular baseband processor 1604 to perform the various functions described supra. The computer-readable medium/memory may also be used for storing data that is manipulated by the cellular baseband processor 1604 when executing software. The cellular baseband processor 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the cellular baseband processor 1604. The cellular baseband processor 1604 may be a component of the UE 350 and may include the memory 360 and/or at least one of the TX processor 368, the RX processor 356, and the controller/processor 359. In one configuration, the apparatus 1602 may be a modem chip and include just the baseband processor 1604, and in another configuration, the apparatus 1602 may be the entire UE (e.g., see 350 of FIG. 3) and include the additional modules of the apparatus 1602.

The communication manager 1632 may include an indication component 1640 that is configured to receive, from a base station, DCI including at least one of: an open loop power control parameter, a maximum transmit power, or a closed loop power control parameter, e.g., as described in connection with 1402 in FIG. 14, or 1502 in FIG. 15. The communication manager 1632 may further include a sidelink component 1642 that may be configured to reduce a transmit power of a scheduled transmission associated with the PSSCH or the PSCCH to a reduced transmit power if the reduced transmit power is above a threshold, e.g., as described in connection with 1404 in FIG. 14, or 1506 in FIG. 15. The sidelink component 1642 may be further configured to cancel the scheduled transmission if the reduced transmit power is below the threshold e.g., as described in connection with 1406 in FIG. 14, or 1508 in FIG. 15. The sidelink component 1642 may be further configured to transmit, to a second UE, the scheduled transmission with the reduced transmit power, e.g., as described in connection with 1510 in FIG. 15. The sidelink component 1642 may be further configured to measure interference level r, e.g., as described in connection with 1504 in FIG. 15.

The apparatus may include additional components that perform each of the blocks of the algorithm in the flowcharts of FIGS. 14-15. As such, each block in the flowcharts of FIGS. 14-15 may be performed by a component and the apparatus may include one or more of those components. The components may be one or more hardware components specifically configured to carry out the stated processes/ algorithm, implemented by a processor configured to perform the stated processes/algorithm, stored within a computer-readable medium for implementation by a processor, or some combination thereof.

As shown, the apparatus 1602 may include a variety of components configured for various functions. In one configuration, the apparatus 1602, and in particular the cellular baseband processor 1604, may include means for receiving, from a base station, DCI including at least one of: an open loop power control parameter, a maximum transmit power, or a closed loop power control parameter. The cellular baseband processor 1604 may further include means for reducing a transmit power of a scheduled transmission associated with the PSSCH or the PSCCH to a reduced transmit power if the reduced transmit power transmit power may be above a threshold or canceling the scheduled transmission if the reduced transmit power may be below the threshold. The reduced transmit power may be based on the open loop power control parameter, the maximum transmit power, or the closed loop power control parameter. The cellular baseband processor 1604 may further include means for measuring an interference level associated with a transmission from an HP UE for a period of time. The cellular baseband processor 1604 may further include means for measuring a RSRP or a first RSSI associated with a DM-RS associated with the overlap. The cellular baseband processor 1604 may further include means for measuring a second RSSI associated with a non-overlapping region of the transmission from the HP UE with the first RSSI. The cellular baseband processor 1604 may further include means for measuring a second transmit power associated with a transmission from an HP UE. The cellular baseband processor 1604 may further include means for calculating the reduced transmit power based on the second transmit power and at least one of the open loop power control parameter, the maximum transmit power, or the closed loop power control parameter. The cellular baseband processor 1604 may further include means for transmitting, to a second UE, the scheduled transmission with the reduced transmit power. The means may be one or more of the components of the apparatus 1602 configured to perform the functions recited by the means. As described supra, the apparatus 1602 may include the TX Processor 368, the RX Processor 356, and the controller/processor 359. As such, in one configuration, the means may be the TX Processor 368, the RX Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Figure 17:
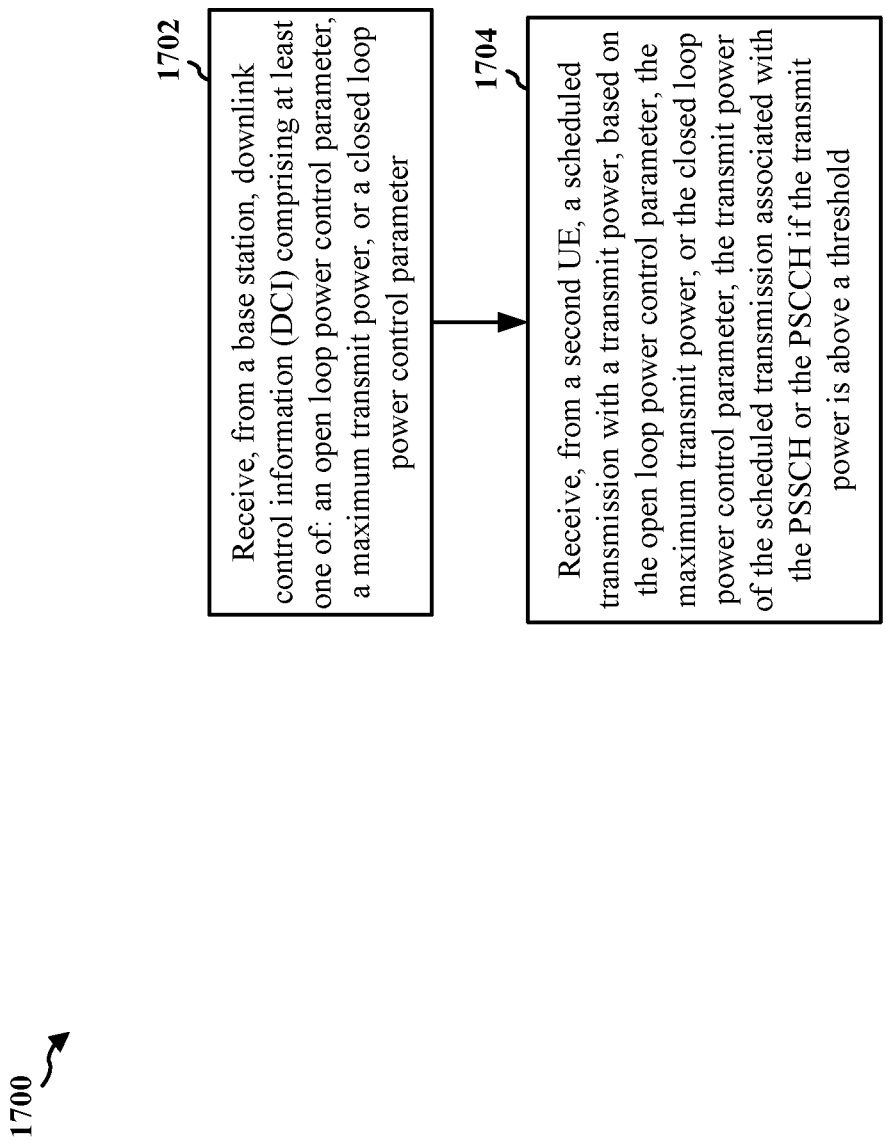
FIG. 17 is a flowchart of a method of wireless communication.

FIG. 17 is a flowchart 1700 of a method of wireless communication. The method may be performed by a UE (e.g., the UE 104, the UE 1306; the apparatus 1802).

At 1702, the UE may receive, from a base station, DCI including at least one of: an open loop power control parameter, a maximum transmit power, or a closed loop power control parameter. The open loop power control parameter, the maximum transmit power, or the closed loop power control parameter may be associated with a PSSCH or PSCCH. For example, the UE 1306 may receive, from a base station, SLCI 1316 carried by DCI including at least one of: an open loop power control parameter, a maximum transmit power, or a closed loop power control parameter. In some aspects, 1702 may be performed by the indication component 1840 in FIG. 18.

At 1704, the UE may receive, from a second UE, a scheduled transmission with a transmit power, based on the open loop power control parameter, the maximum transmit power, or the closed loop power control parameter, the transmit power of the scheduled transmission associated with the PSSCH or the PSCCH if the transmit power is above a threshold. For example, the UE 1306 may receive, from a second UE 1302, a scheduled transmission (e.g., the sidelink transmission 1320) with a transmit power, based on the open loop power control parameter, the maximum transmit power, or the closed loop power control parameter, the transmit power of the scheduled transmission associated with the PSSCH or the PSCCH if the transmit power is above a threshold. In some aspects, 1704 may be performed by the sidelink component 1842 in FIG. 18. In some aspects, the threshold may be based on an interference level associated with a transmission from an HP UE to the UE for a period of time. In some aspects, the transmission from the HP UE may include an overlap with the scheduled transmission. In some aspects, the overlap may be associated with a ZP-CSI-RS for IM. In some aspects, the period of time may be based on a duration of the overlap or configured by the base station. In some aspects, the interference level may be based on an RSRP or a first RSSI associated with a DM-RS associated with the overlap. In some aspects, the interference level may be based on an RSRP or a first RSSI associated with a DM-RS associated with the overlap. In some aspects, the threshold may be further based on a second RSSI associated with a non-overlapping region of the transmission from the HP UE with the first RSSI. In some aspects, the threshold may be associated with an SINR associated with a sufficient power for decoding based on the interference level. In some aspects, the threshold may be within an upper limit or a lower limit configured by the base station. In some aspects, the transmit power may be based on a second transmit power associated with a transmission from an HP UE to the UE and at least one of the open loop power control parameter, the maximum transmit power, or the closed loop power control parameter. In some aspects, the transmit power may be further based on a number of resource blocks associated with the PSSCH. In some aspects, the transmit power may be further based on a power control factor associated with the PSSCH or the PSCCH. In some aspects, the transmit power may be further based on a measured interference associated with the PSSCH or the PSCCH. In some aspects, the transmit power may be further based on a power back-off.

Figure 18:
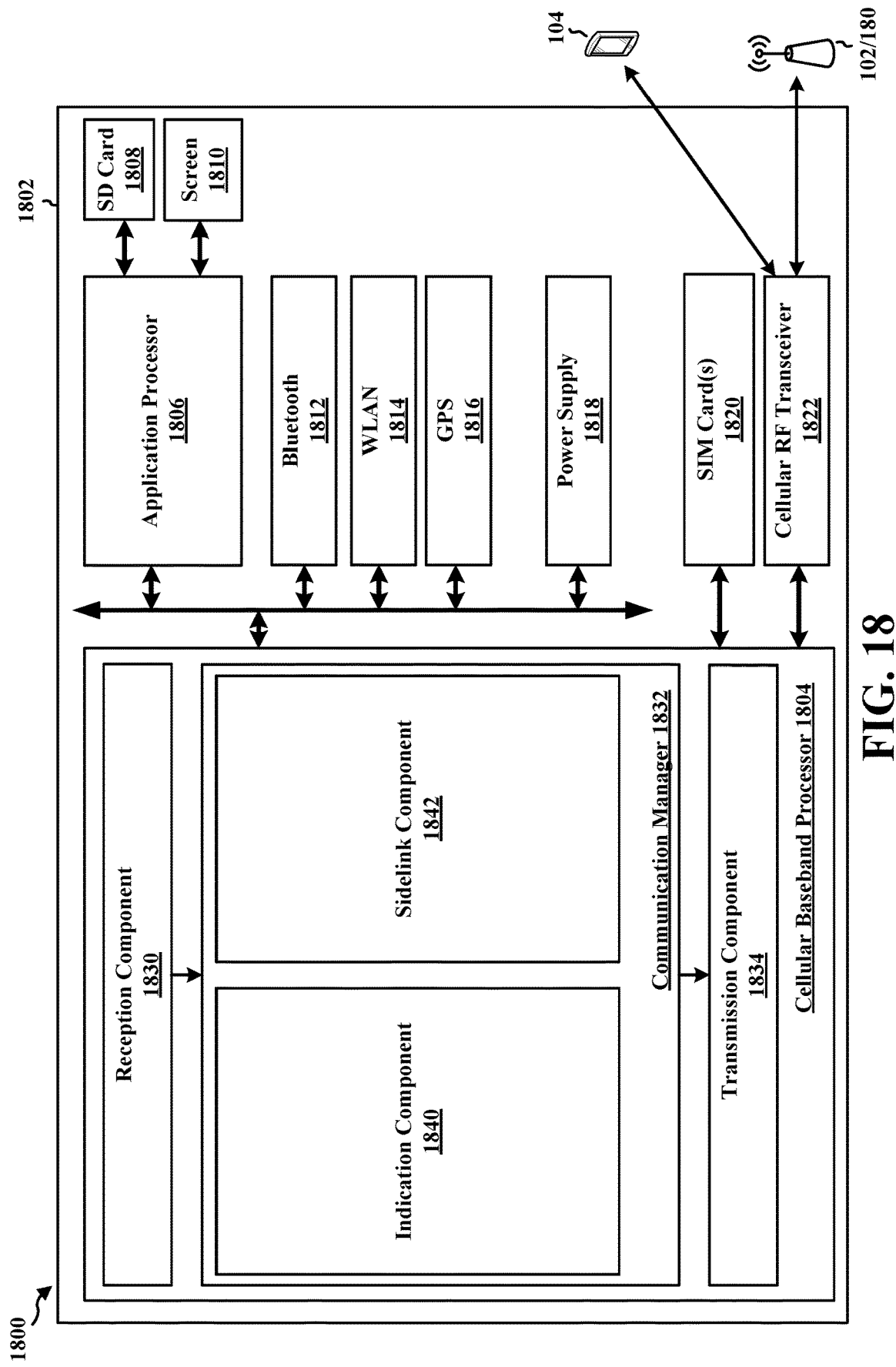
FIG. 18 is a diagram illustrating an example of a hardware implementation for an example apparatus.

FIG. 18 is a diagram 1800 illustrating an example of a hardware implementation for an apparatus 1802. The apparatus 1802 may be a UE, a component of a UE, or may implement UE functionality. In some aspects, the apparatus 1802 may include a cellular baseband processor 1804 (also referred to as a modem) coupled to a cellular RF transceiver 1822. In some aspects, the apparatus 1802 may further include one or more subscriber identity modules (SIM) cards 1820, an application processor 1806 coupled to a secure digital (SD) card 1808 and a screen 1810, a Bluetooth module 1812, a wireless local area network (WLAN) module 1814, a Global Positioning System (GPS) module 1816, or a power supply 1818. The cellular baseband processor 1804 communicates through the cellular RF transceiver 1822 with the UE 104 and/or BS 102/180. The cellular baseband processor 1804 may include a computer-readable medium/memory. The computer-readable medium/memory may be non-transitory. The cellular baseband processor 1804 is responsible for general processing, including the execution of software stored on the computer-readable medium/memory. The software, when executed by the cellular baseband processor 1804, causes the cellular baseband processor 1804 to perform the various functions described supra. The computer-readable medium/memory may also be used for storing data that is manipulated by the cellular baseband processor 1804 when executing software. The cellular baseband processor 1804 further includes a reception component 1830, a communication manager 1832, and a transmission component 1834. The communication manager 1832 includes the one or more illustrated components. The components within the communication manager 1832 may be stored in the computer-readable medium/memory and/or configured as hardware within the cellular baseband processor 1804. The cellular baseband processor 1804 may be a component of the UE 350 and may include the memory 360 and/or at least one of the TX processor 368, the RX processor 356, and the controller/processor 359. In one configuration, the apparatus 1802 may be a modem chip and include just the baseband processor 1804, and in another configuration, the apparatus 1802 may be the entire UE (e.g., see 350 of FIG. 3) and include the additional modules of the apparatus 1802.

The communication manager 1832 may include an indication component 1840 that is configured to receive, from a base station, DCI including at least one of: an open loop power control parameter, a maximum transmit power, or a closed loop power control parameter, e.g., as described in connection with 1702 in FIG. 17. The communication manager 1832 may further include a sidelink component 1842 that may be configured to receive, from a second UE, a scheduled transmission with a transmit power, based on the open loop power control parameter, the maximum transmit power, or the closed loop power control parameter, the transmit power of the scheduled transmission associated with the PSSCH or the PSCCH if the transmit power is above a threshold, e.g., as described in connection with 1704 in FIG. 17.

The apparatus may include additional components that perform each of the blocks of the algorithm in the flowchart of FIG. 17. As such, each block in the flowchart of FIG. 17 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1802 may include a variety of components configured for various functions. In one configuration, the apparatus 1802, and in particular the cellular baseband processor 1804, may include means for receiving, from a base station, DCI including at least one of: an open loop power control parameter, a maximum transmit power, or a closed loop power control parameter. The cellular baseband processor 1804 may further include means for receiving, from a second UE, a scheduled transmission with a transmit power, based on the open loop power control parameter, the maximum transmit power, or the closed loop power control parameter, the transmit power of the scheduled transmission associated with the PSSCH or the PSCCH if the transmit power is above a threshold. The means may be one or more of the components of the apparatus 1802 configured to perform the functions recited by the means. As described supra, the apparatus 1802 may include the TX Processor 368, the RX Processor 356, and the controller/processor 359. As such, in one configuration, the means may be the TX Processor 368, the RX Processor 356, and the controller/processor 359 configured to perform the functions recited by the means.

Aspects provided herein support soft cancellation for sidelink transmissions which may improve latency performance, reliability, and throughput in communication systems, such as communication systems with URLLC. In a wireless communication system, an HP sidelink or non-sidelink transmission may be scheduled after a LP sidelink transmission is already scheduled. The HP sidelink or non-sidelink transmission use time and frequency resources that may overlap with at least a portion of the LP sidelink transmission. Aspects provided herein enable a base station to indicate a soft cancellation to a transmitting UE of the LP sidelink transmission, so that the transmitting UE may cancel or reduce transmit power of the LP sidelink transmission based on an interference to the HP sidelink or non-sidelink transmission. By enabling the flexibility of cancelling or reducing the transmit power, the potential interference between the LP transmission and the HP sidelink or non-sidelink transmission may be more efficiently resolved.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE, including: a memory; and at least one processor coupled to the memory and configured to: receive, from a base station, DCI including at least one of: an open loop power control parameter, a maximum transmit power, or a closed loop power control parameter, the open loop power control parameter, the maximum transmit power, or the closed loop power control parameter may be associated with a PSSCH or a PSCCH; and reduce a transmit power of a scheduled transmission associated with the PSSCH or the PSCCH to a reduced transmit power if the reduced transmit power may be above a threshold or cancel the scheduled transmission if the reduced transmit power may be below the threshold, where the reduced transmit power may be based on the open loop power control parameter, the maximum transmit power, or the closed loop power control parameter.

Aspect 2 is the apparatus of aspect 1, where the at least one processor coupled to the memory may be further configured to: measure an interference level associated with a transmission from an HP UE for a period of time, where the transmission from the HP UE includes an overlap with the scheduled transmission, where the threshold may be based on the measured interference level.

Aspect 3 is the apparatus of any of aspects 1-2, where the overlap may be associated with a ZP-CSI-RS for IM.

Aspect 4 is the apparatus of any of aspects 1-3, where the period of time may be based on a duration of the overlap or configured by the base station.

Aspect 5 is the apparatus of any of aspects 1-4, where to measure the interference level, the at least one processor coupled to the memory may be configured to measure a RSRP or a first RSSI associated with a DM-RS associated with the overlap, and where a configuration comprising a sequence form and one or more time and frequency resources associated with the DM-RS is received from the base station the DM-RS may be received from the base station.

Aspect 6 is the apparatus of any of aspects 1-5, where the at least one processor coupled to the memory may be further configured to: measure a second RSSI associated with a non-overlapping region of the transmission from the HP UE with the first RSSI, where the threshold may be based on the second RSSI.

Aspect 7 is the apparatus of any of aspects 1-6, where the threshold may be associated with a SINR associated with a sufficient power for decoding based on the interference level.

Aspect 8 is the apparatus of any of aspects 1-7, where the threshold may be within an upper limit or a lower limit configured by the base station.

Aspect 9 is the apparatus of any of aspects 1-8, where to reduce the transmit power, the at least one processor coupled to the memory may be further configured to: measure a second transmit power associated with a transmission from an HP UE; and calculate the reduced transmit power based on the second transmit power and at least one of the open loop power control parameter, the maximum transmit power, or the closed loop power control parameter.

Aspect 10 is the apparatus of any of aspects 1-9, where the reduced transmit power may be further based on a number of resource blocks associated with the PSSCH.

Aspect 11 is the apparatus of any of aspects 1-10, where the reduced transmit power may be further based on a power control factor associated with the PSSCH or the PSCCH.

Aspect 12 is the apparatus of any of aspects 1-11, where the reduced transmit power may be further based on a measured interference associated with the PSSCH or the PSCCH.

Aspect 13 is the apparatus of any of aspects 1-12, where the reduced transmit power may be further based on a power back-off.

Aspect 14 is the apparatus of any of aspects 1-13, further comprising a transceiver coupled to the at least one processor, where the at least one processor coupled to the memory may be further configured to: transmit, to a second UE, the scheduled transmission with the reduced transmit power.

Aspect 15 is an apparatus for wireless communication at a UE, comprising: a memory; and at least one processor coupled to the memory and configured to: receive, from a base station, DCI comprising at least one of: an open loop power control parameter, a maximum transmit power, or a closed loop power control parameter, wherein the open loop power control parameter, the maximum transmit power, or the closed loop power control parameter is associated with a PSSCH or PSCCH; and receive, from a second UE, a scheduled transmission with a transmit power, based on the open loop power control parameter, the maximum transmit power, or the closed loop power control parameter, the transmit power of the scheduled transmission associated with the PSSCH or the PSCCH if the transmit power may be above a threshold.

Aspect 16 is the apparatus of aspect 15, where the threshold may be based on an interference level associated with a transmission from an HP UE to the UE for a period of time, where the transmission from the HP UE includes an overlap with the scheduled transmission.

Aspect 17 is the apparatus of any of aspects 15-16, where the overlap may be associated with a ZP-CSI-RS for IM.

Aspect 18 is the apparatus of any of aspects 15-17, where the period of time may be based on a duration of the overlap or configured by the base station.

Aspect 19 is the apparatus of any of aspects 15-18, where the interference level may be based on a RSRP or a first RSSI associated with a DM-RS associated with the overlap, and where the DM-RS may be transmitted from the base station.

Aspect 20 is the apparatus of any of aspects 15-19, where the threshold may be further based on a second RSSI associated with a non-overlapping region of the transmission from the HP UE with the first RSSI.

Aspect 21 is the apparatus of any of aspects 15-20, where the threshold may be associated with a SINR associated with a sufficient power for decoding based on the interference level.

Aspect 22 is the apparatus of any of aspects 15-21, where the threshold may be within an upper limit or a lower limit configured by the base station.

Aspect 23 is the apparatus of any of aspects 15-22, where the transmit power may be based on a second transmit power associated with a transmission from an HP UE to the UE and at least one of the open loop power control parameter, the maximum transmit power, or the closed loop power control parameter.

Aspect 24 is the apparatus of any of aspects 15-23, where the transmit power may be further based on a number of resource blocks associated with the PSSCH.

Aspect 25 is the apparatus of any of aspects 15-24, where the transmit power may be further based on a power control factor associated with the PSSCH or the PSCCH.

Aspect 26 is the apparatus of any of aspects 15-25, where the transmit power may be further based on a measured interference associated with the PSSCH or the PSCCH.

Aspect 27 is the apparatus of any of aspects 15-26, where the transmit power may be further based on a power back-off.

Aspect 28 is the apparatus of any of aspects 15-27, further including a transceiver coupled to the at least one processor.

Aspect 29 is a method of wireless communication for implementing any of aspects 1 to 14.

Aspect 30 is an apparatus for wireless communication including means for implementing any of aspects 1 to 14.

Aspect 31 is a computer-readable medium storing computer executable code, where the code when executed by a processor causes the processor to implement any of aspects 1 to 14.

Aspect 32 is a method of wireless communication for implementing any of aspects 15 to 28.

Aspect 33 is an apparatus for wireless communication including means for implementing any of aspects 15 to 28.

Aspect 34 is a computer-readable medium storing computer executable code, where the code when executed by a processor causes the processor to implement any of aspects 15 to 28.

What is claimed is:

1. An apparatus for wireless communication at a first user equipment (UE), comprising:
   one or more memories; and
   one or more processors coupled to the one or more memories and configured to:
   receive, from a base station, downlink control information (DCI) comprising at least one of: an open loop power control parameter, a maximum transmit power, or a closed loop power control parameter, wherein the open loop power control parameter, the maximum transmit power, or the closed loop power control parameter is associated with a physical sidelink shared channel (PSSCH) or a physical sidelink control channel (PSCCH);
   reduce a transmit power of a scheduled transmission associated with the PSSCH or the PSCCH to a reduced transmit power if the reduced transmit power is above a threshold or cancel the scheduled transmission if the reduced transmit power is below the threshold, wherein the reduced transmit power is based on the open loop power control parameter, the maximum transmit power, or the closed loop power control parameter; and
   measure an interference level associated with a transmission from a high-priority (HP) UE for a period of time, wherein the transmission from the HP UE comprises an overlap with the scheduled transmission, wherein the threshold is based on the measured interference level.

2. The apparatus of claim 1, wherein the overlap is associated with a zero power (ZP) channel state information (CSI) reference signal (RS) (ZP-CSI-RS) for interference measurement (IM).

3. The apparatus of claim 1, wherein the period of time is based on a duration of the overlap or configured by the base station.

4. The apparatus of claim 1, wherein to measure the interference level, the one or more processors coupled to the one or more memories is configured to measure a reference signal receive power (RSRP) or a first received signal strength indicator (RSSI) associated with a demodulation reference signal (DM-RS) associated with the overlap, and wherein a configuration comprising a sequence form and one or more time and frequency resources associated with the DM-RS is received from the base station.

5. The apparatus of claim 4, wherein the one or more processors coupled to the one or more memories is further configured to:
   measure a second RSSI associated with a non-overlapping region of the transmission from the HP UE with the first RSSI, wherein the threshold is based on the second RSSI.

6. The apparatus of claim 5, wherein the threshold is associated with a signal-to-interference plus noise ratio (SINR) associated with a sufficient power for decoding based on the interference level.

7. The apparatus of claim 6, wherein the threshold is within an upper limit or a lower limit configured by the base station.

8. An apparatus for wireless communication at a first user equipment (UE), comprising:
   one or more memories; and
   one or more processors coupled to the one or more memories and configured to:
   receive, from a base station, downlink control information (DCI) comprising at least one of: an open loop power control parameter, a maximum transmit power, or a closed loop power control parameter, wherein the open loop power control parameter, the maximum transmit power, or the closed loop power control parameter is associated with a physical sidelink shared channel (PSSCH) or a physical sidelink control channel (PSCCH);
   reduce a transmit power of a scheduled transmission associated with the PSSCH or the PSCCH to a reduced transmit power if the reduced transmit power is above a threshold or cancel the scheduled transmission if the reduced transmit power is below the threshold, wherein the reduced transmit power is based on the open loop power control parameter, the maximum transmit power, or the closed loop power control parameter; and
   wherein to reduce the transmit power, the one or more processors coupled to the one or more memories is further configured to:
   measure a second transmit power associated with a transmission from a high-priority (HP) UE; and
   calculate the reduced transmit power based on the second transmit power and at least one of the open loop power control parameter, the maximum transmit power, or the closed loop power control parameter.

9. The apparatus of claim 8, wherein the reduced transmit power is further based on a number of resource blocks associated with the PSSCH.

10. The apparatus of claim 8, wherein the reduced transmit power is further based on a power control factor associated with the PSSCH or the PSCCH.

11. The apparatus of claim 8, wherein the reduced transmit power is further based on a measured interference associated with the PSSCH or the PSCCH.

12. The apparatus of claim 8, wherein the reduced transmit power is further based on a power back-off.

13. The apparatus of claim 11, further comprising a transceiver coupled to the one or more processors, wherein the one or more processors coupled to the one or more memories is further configured to:
transmit, to a second UE, the scheduled transmission with the reduced transmit power.

14. An apparatus for wireless communication at a first user equipment (UE), comprising:
one or more memories; and
one or more processors coupled to the one or more memories and configured to:
receive, from a base station, downlink control information (DCI) comprising at least one of: an open loop power control parameter, a maximum transmit power, or a closed loop power control parameter, wherein the open loop power control parameter, the maximum transmit power, or the closed loop power control parameter is associated with a physical sidelink shared channel (PSSCH) or a physical sidelink control channel (PSCCH); and
receive, from a second UE, a scheduled transmission with a transmit power, based on the open loop power control parameter, the maximum transmit power, or the closed loop power control parameter, the transmit power of the scheduled transmission associated with the PSSCH or the PSCCH if the transmit power is above a threshold;
wherein the threshold is based on an interference level associated with a transmission from a high-priority (HP) UE to the first UE for a period of time, wherein the transmission from the HP UE includes an overlap with the scheduled transmission.

15. The apparatus of claim 14, wherein the overlap is associated with a zero power (ZP) CSI RS (ZP-CSI-RS) for interference measurement (IM).

16. The apparatus of claim 14, wherein the period of time is based on a duration of the overlap or configured by the base station.

17. The apparatus of claim 14, wherein the interference level is based on a reference signal receive power (RSRP) or a first received signal strength indicator (RSSI) associated with a demodulation reference signal (DM-RS) associated with the overlap, and wherein the DM-RS is transmitted from the base station.

18. The apparatus of claim 17, wherein the threshold is further based on a second RSSI associated with a non-overlapping region of the transmission from the HP UE with the first RSSI.

19. The apparatus of claim 18, wherein the threshold is associated with a signal-to-interference plus noise ratio (SINR) associated with a sufficient power for decoding based on the interference level.

20. The apparatus of claim 19, wherein the threshold is within an upper limit or a lower limit configured by the base station.

21. An apparatus for wireless communication at a first user equipment (UE), comprising:
one or more memories; and
one or more processors coupled to the one or more memories and configured to:
receive, from a base station, downlink control information (DCI) comprising at least one of: an open loop power control parameter, a maximum transmit power, or a closed loop power control parameter, wherein the open loop power control parameter, the maximum transmit power, or the closed loop power control parameter is associated with a physical sidelink shared channel (PSSCH) or a physical sidelink control channel (PSCCH); and
receive, from a second UE, a scheduled transmission with a transmit power, based on the open loop power control parameter, the maximum transmit power, or the closed loop power control parameter, the transmit power of the scheduled transmission associated with the PSSCH or the PSCCH if the transmit power is above a threshold;
wherein the transmit power is based on a second transmit power associated with a transmission from a high-priority (HP) UE to the first UE and at least one of the open loop power control parameter, the maximum transmit power, or the closed loop power control parameter.

22. The apparatus of claim 21, wherein the transmit power is further based on a number of resource blocks associated with the PSSCH.

23. The apparatus of claim 21, wherein the transmit power is further based on a power control factor associated with the PSSCH or the PSCCH.

24. The apparatus of claim 21, wherein the transmit power is further based on a measured interference associated with the PSSCH or the PSCCH.

25. The apparatus of claim 21, wherein the transmit power is further based on a power back-off.

26. The apparatus of claim 14, further including a transceiver coupled to the one or more processors.

27. A method for wireless communication at a first user equipment (UE), including:
receiving, from a base station, DCI including at least one of: an open loop power control parameter, a maximum transmit power, or a closed loop power control parameter, The open loop power control parameter, the maximum transmit power, or the closed loop power control parameter may be associated with a PSSCH or a PSCCH;
reducing a transmit power of a scheduled transmission associated with the PSSCH or the PSCCH to a reduced transmit power if the reduced transmit power is above a threshold or cancelling the scheduled transmission if the reduced transmit power is below the threshold, wherein the reduced transmit power is based on the open loop power control parameter, the maximum transmit power, or the closed loop power control parameter; and
measuring an interference level associated with a transmission from a high-priority (HP) UE for a period of time, wherein the transmission from the HP UE comprises an overlap with the scheduled transmission, wherein the threshold is based on the measured interference level.

28. A method for wireless communication at a first user equipment (UE), including:

receiving, from a base station, downlink control information (DCI) comprising at least one of: an open loop power control parameter, a maximum transmit power, or a closed loop power control parameter, wherein the open loop power control parameter, the maximum transmit power, or the closed loop power control parameter is associated with a physical sidelink shared channel (PSSCH) or a physical sidelink control channel (PSCCH); and receiving, from a second UE, a scheduled transmission with a transmit power, based on the open loop power control parameter, the maximum transmit power, or the closed loop power control parameter, the transmit power of the scheduled transmission associated with the PSSCH or the PSCCH if the transmit power is above a threshold;

wherein the threshold is based on an interference level associated with a transmission from a high-priority (HP) UE to the first UE for a period of time, wherein the transmission from the HP UE includes an overlap with the scheduled transmission.

\* \* \* \* \*